United States Patent
Vezier et al.

(10) Patent No.: US 12,159,165 B2
(45) Date of Patent: Dec. 3, 2024

(54) COMMUNICATION INTERFACES SUITED FOR USE WITH FLEXIBLE LOGIC UNITS

(71) Applicant: Silicon Mobility SAS, Valbonne (FR)

(72) Inventors: Loïc Jean Dominique Vezier, La Roquette sur Siagne (FR); Anselme Joseph Francis Lebrun, Mougins (FR)

(73) Assignee: Silicon Mobility SAS, Valbonne (FR)

( * ) Notice: Subject to any disclaimer, the term of this patent is extended or adjusted under 35 U.S.C. 154(b) by 672 days.

(21) Appl. No.: 17/413,345

(22) PCT Filed: Dec. 14, 2018

(86) PCT No.: PCT/EP2018/085060
§ 371 (c)(1),
(2) Date: Jun. 11, 2021

(87) PCT Pub. No.: WO2020/119931
PCT Pub. Date: Jun. 18, 2020

(65) Prior Publication Data
US 2022/0019464 A1    Jan. 20, 2022

(51) Int. Cl.
*G06F 9/38*     (2018.01)
*G06F 9/48*     (2006.01)
*G06F 9/54*     (2006.01)

(52) U.S. Cl.
CPC .......... *G06F 9/4881* (2013.01); *G06F 9/3836* (2013.01); *G06F 9/485* (2013.01); *G06F 9/546* (2013.01)

(58) Field of Classification Search
CPC ...... G06F 9/4881; G06F 9/3836; G06F 9/485; G06F 9/546
See application file for complete search history.

(56) References Cited

U.S. PATENT DOCUMENTS

| | | | |
|---|---|---|---|
| 6,216,191 B1* | 4/2001 | Britton | G06F 13/385 |
| | | | 710/305 |
| 7,546,441 B1* | 6/2009 | Ansari | G06F 9/3869 |
| | | | 712/225 |

(Continued)

FOREIGN PATENT DOCUMENTS

| | | |
|---|---|---|
| WO | 2002082267 A1 | 10/2002 |
| WO | 2004021136 A2 | 3/2004 |

OTHER PUBLICATIONS

Figuli et al. A heterogeneous SoC Architecture with embedded virtual FPGA Cores and runtime Core Fusion. [online] IEEE., pp. 96-103. Retrieved From the Internet <https://ieeexplore.ieee.org/stamp/stamp.jsp?arnumber=5963922> (Year: 2011).*

(Continued)

*Primary Examiner* — Emerson C Puente
*Assistant Examiner* — Jonathan R Labud
(74) *Attorney, Agent, or Firm* — Viering, Jentschura & Partner mbB; Samuel Y. Lo

(57) ABSTRACT

The invention relates to an electronic system, comprising components and/or units of various kind, hence the electronic system can be called a heterogeneous system and special interfaces therein between. The invented electronic system can be applied in the electric system digital control domain and in particular it is targeting (but not limited to) control of power train of pure electric or hybrid vehicle electric motors that require hard real time and safe control.

14 Claims, 22 Drawing Sheets

(56) References Cited

U.S. PATENT DOCUMENTS

| | | |
|---|---|---|
| 7,912,997 B1 | 3/2011 | Murray |
| 2011/0178774 A1* | 7/2011 | Migdall ................ H04J 3/0644 702/187 |

OTHER PUBLICATIONS

Pezzarossa et al. Reconfiguration in FPGA-Based Multi-Core Platforms for Hard Real-Time Applications. [online] IEEE., pp. 1-8. Retrieved From the Internet <https://ieeexplore.ieee.org/stamp/stamp.jsp?arnumber=7533895> (Year: 2016).*
Search Report and Written Opinion pertaining to Application No. PCT/EP2018/085060 dated Aug. 26, 2019.
International Preliminary Report on Patentability pertaining to Application No. PCT/EP2018/085060 dated Apr. 23, 2021.

* cited by examiner

COMMUNICATION INTERFACES SUITED FOR USE WITH FLEXIBLE LOGIC UNITS

CROSS REFERENCES TO RELATED APPLICATIONS

This application is a national-stage application under 35 U.S.C. § 371 of International Application No. PCT/EP2018/085060, filed Dec. 14, 2018.

FIELD OF THE INVENTION

The invention relates to an electronic system, comprising components and/or units of various kind, hence the electronic system can be called a heterogeneous system. The invented electronic system can be applied in the electric system digital control domain and in particular it is targeting (but not limited to) control of power train of pure electric or hybrid vehicle electric motors that require hard real time and safe control.

BACKGROUND OF THE INVENTION

Existing heterogeneous system for the electric system digital control domain and in particular for control of power train of pure electric or hybrid vehicle electric motors cannot provide hard real time and safe control as required.

AIM OF THE INVENTION

The invention provides (a combination of) solutions to facilitate the information (data) flow between such components and/or units, that otherwise might be compromised due to the variety of their respective nature.

SUMMARY OF THE INVENTION

The invention provides (a combination of) interfaces that facilitate the information (data) flow between such components and/or units, that otherwise might be compromised due to the variety of their respective nature.

The invention provides a heterogeneous hardware system (50), (80), comprising: (i) an electronic component (10), (50); (ii) (iii) a first communication means (40) (70), suitable for communication (at least unidirectional) between said electronic component (10) and said hardware programmable unit (20); said heterogeneous hardware system (50) (80) further comprising: (iv) an communication interface (30), (60), provided between said first communication means (40) (70) and said hardware programmable unit (20) to support communication (at least unidirectional) between said electronic component (10) and said hardware programmable unit via said first communication means, hence indirect communication.

It should be emphasized that the above components, means and interface are all on the same chip.

In a preferred embodiment of the invention the hardware programmable unit (20), being a programmable logic matrix is adapted for sequentially execution of at least two tasks, and hence task switching occurs during the execution of (user) programs on said system.

In an embodiment of the invention the first communication means (40) (70), is suitable for bidirectional communication between said electronic component (10) and said hardware programmable unit (20).

In a preferred embodiment of the invention said communication interface comprises one or more means (150), (130), (210), (220) for storing to be exchanged communication in a queue.

In a further preferred embodiment the heterogeneous hardware system comprising one or more second communication means, suitable for (at least unidirectional) direct communication between said electronic component (10) and said hardware programmable unit (20) and provided therein between.

The invention is further specified for central processing unit or CPU and the like units with a flexible logic unit or FLU and also for peripheral units with a FLU but these embodiments can be combined in a variety of ways.

In a first combination as shown in FIG. 16 the embodiments are just combined, hence each keep using via their respective interface their bus, in particular this results in a heterogeneous hardware system (300), comprising: (i) an first electronic component (10), (ii) an second electronic component (53); (iii) a hardware programmable unit (20), being adapted for sequentially execution of at least two tasks; (iv) a first communication means (40) suitable for communication between said first electronic component (10) and said hardware programmable unit (20); (v) a second communication means (70), suitable for communication between said second electronic component (50) and said hardware programmable unit (20); said heterogeneous hardware system (50) (80) further comprising: (vi) a first communication interface (30), provided between said first communication means (40) and said hardware programmable unit (20) and (vii) a second communication interface (60), provided between said second communication means (70) and said hardware programmable unit (20).

In a second embodiment as shown in FIG. 17 units are sharing the same bus, resulting in a heterogeneous hardware system (300), comprising: (i) an first electronic component (10), (ii) an second electronic component (53); (iii) a hardware programmable unit (20), being adapted for sequentially execution of at least two tasks; (iv) a first communication means (40)(70) suitable for communication between said first electronic component (10) and said hardware programmable unit (20), said heterogeneous hardware system further comprising: (v) a first communication interface (30), provided between said first communication means (40), (70) and said hardware programmable unit (20) (more in particular with first data ports (320) thereof) and (vi) a second communication interface (60), provided between said first communication means (40), (70) and said hardware programmable unit (20) (more in particular with second data ports (310) thereof, distinct from said first data ports).

In preferred embodiment thereof an additional arbitration means is foreseen as illustrated in FIG. 18 resulting a heterogeneous hardware system (300), comprising: (i) an first electronic component (10), (ii) an second electronic component (53); (iii) a hardware programmable unit (20), being adapted for sequentially execution of at least two tasks; (iv) a first communication means (40)(70) suitable for communication between said first electronic component (10) and said hardware programmable unit (20), said heterogeneous hardware system further comprising: (v) an arbitration means (340), communicating with data ports (330) of said hardware programmable unit (20), (vi) a first communication interface (30), provided between said first communication means (40), (70) and said arbitration means and (vii) a second communication interface (60), provided between said first communication means (40), (70) and said arbitration means.

Note that the use of said arbitration means can be applied *mutatis mutandis* to the embodiment illustrated in FIG. 16.

DETAILED DESCRIPTION

Figure 1:
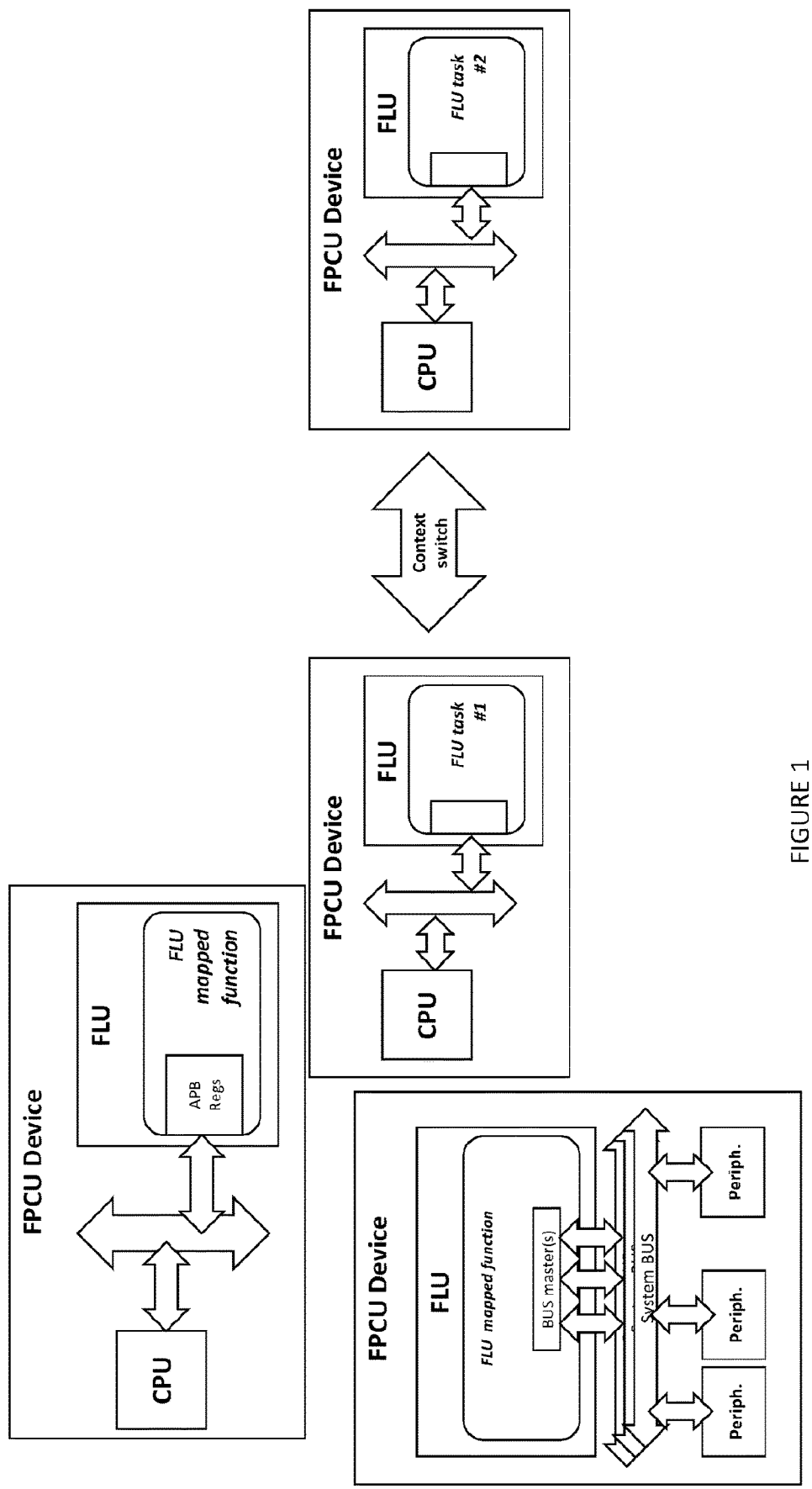
FIG. 1 relates to systems to which the invented aspects can be applied.

The invention relates to an electronic system, comprising components and/or units of various kind, hence the electronic system can be called a heterogeneous system, more in particular the invention relates to addition means within such electronic system to facilitate the information (data) flow between such components and/or units, that otherwise might be compromised due to the variety of their respective nature.

The invented electronic system can be applied in the electric system digital control domain and in particular it is targeting (but not limited to) control of power train of pure electric or hybrid vehicle electric motors that require hard real time and safe control.

A particular embodiment of such electronic system is a FPCU kind of integrated circuit with features such as "standard" SOC architecture (CPU core(s), interconnect, memory, DMA, communication peripherals) combined with a "dedicated" sub-system consisting of one or multiple eFPGA matrices (called flexible logic unit or FLU), for instance and preferably with fast task context switching capability and/or power-train ready peripherals.

In such a system, it is very important to carefully handle the I/O communication between the FLU, the peripherals and/or the CPU in order to take full advantages of the eFPGA computing power in terms of parallelism and hard real-time.

The invention is especially suitable to cope with situations where the FPCU component is responsible for multiple concurrent applications (inverter control, DCDC control, ADAS decision making). For functional safety reasons, each application must be "sand boxed" with virtualization mechanisms to avoid interference between each application.

More generally speaking the invention relates to a heterogeneous hardware system comprising: (i) at least one electronic component; (ii) a hardware programmable unit, being a programmable logic matrix and (iii) an communication interface facilitating communication between said electronic component and said unit, wherein said electronic component either being (a) a software programmable unit, preferably a microprocessor core or a graphics or the like processor core or (b) said electronic component being a peripheral hardware unit.

In the context of FPCU architecture we can distinguish two kinds of peripherals:

"System interface peripherals"
  Those ones are dedicated to stream application data from(to) the external system.
  Their role is to extract(encapsulate) the "payload" data from(to) the physical transport protocols used at system level.

"Processing accelerators"
  Those are purely internal to the FPCU
  Their role is to accelerate complex mathematical operations.

It is worth noting that the software programmable unit and the hardware programmable unit (CPU/GPU, FLU components respectively) are responsible for executing a function that is fully defined by final user (i.e: programmable) while a peripheral provides a set of pre-defined and optimized functions instead.

Context Agnostic Triggering

In an preferred architecture, many "trigger" signals are transmitted between peripherals, DMA and FLU to perform synchronization and sequencing of the different functions therein. So, the FLU is able to receive multiple trigger inputs to internal usage. Indeed, each trigger may be associated to one of the context-switched tasks executed in FLU. The problem is that the trigger signals are rising edge. The trigger emitter shall guarantee that the trigger is long enough to last at least one FLU clock cycle so that this one can sample the rising edge correctly. But at this time, the target FLU mapped task may not be active in the FLU because of context switched on another task. So, the trigger event may be lost. The invention further provides additional solutions to tackle this.

Flu Task Identification for Safety and Virtualisation

The concept of virtualization is already well known and widely used on software running on CPU cores. In the concept of FPCU component, a part of the firmware actually runs as FLU mapped function. So, we have to extend the virtualization mechanisms to the FLU. As a matter of fact, the problem to solve is to make sure that the task executed in FLU cannot not access memory map areas that are outside of its allowed scope. From the system point of view, the memory map access rights are managed with multi-layer memory protection units (MPU) configured by software. When FLU is operating fast context switching between multiple tasks that belong to different applications, we have to put in place hardware mechanisms to handle the "sand-boxing" of those tasks automatically because CPU is not aware of switching time and it is not fast enough anyway. So, the CPU software cannot re-configure the MPUs at the correct moment with regards to FLU task switching.

It is to be emphasized that the system may comprise of a plurality of said electronic components (whether software programmable or peripheral units); hardware programmable units, and likewise communication interfaces for facilitating communication between each of said electronic components and said units.

The invention will first be described for the context of a software programmable unit and later for the peripheral unit such that particularities for each of these contexts can be addressed. At the stage it suffices to state that both context can be present in one system as a combination and that the provided solutions do have commonalities that we will address at the end of this description.

Overall the invention can be described as a heterogeneous hardware system (50) comprising: (i) an electronic component (10); (ii) a hardware programmable unit (20), being a programmable logic matrix; (iii) a first communication means (40) (70), suitable for (bidirectional) communication between said electronic component (10) and said hardware programmable unit (20); said heterogeneous hardware system (50) (80) by further comprising: (iv) an communication interface (30), provided between said first communication means (40) (70) and said hardware programmable unit (20).

Part a Flexible Logic Unit in Combination with a Cpu or the Like Component

As introduced above, a considered target system is an FPCU. This means, in particular, that one (or more) CPU core and one (or more) FLU (eFPGA) matrices exist in the integrated circuit. In this context, it is required that the CPU can communicate with the functions mapped in the FLU. For, this a regular SOC interconnect bus is used, where the CPU is master, and the FLU is slave. An exemplary embodiment is shown in FIG. 1 LEFT.

Consider now a FLU matrix, capable of (very fast) task switching. This means, that on a time sharing basis, the FLU matrix executes multiple independent tasks as illustrated in FIG. 1 RIGHT. The task switching trigger can be managed by hardware. Therefore, the software is never aware of which task is actually running in the FLU at any point of time. So, when the CPU tries to read/write bus access to the FLU, it has not means to make sure it actually accesses the task it expected.

Figure 2:
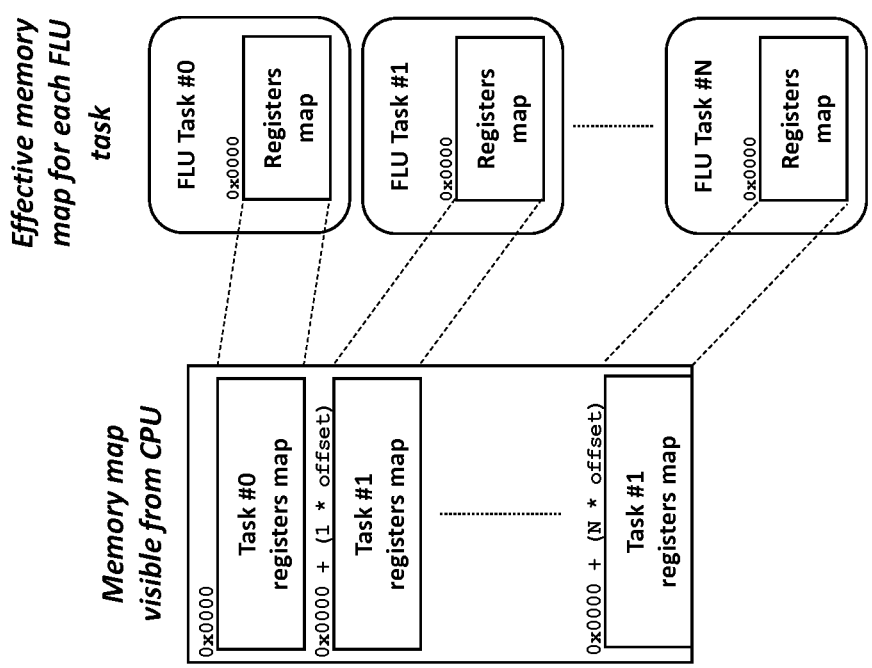
FIG. 2 relates to the extended concept of virtual memory as provided by this invention.
Figure 5:
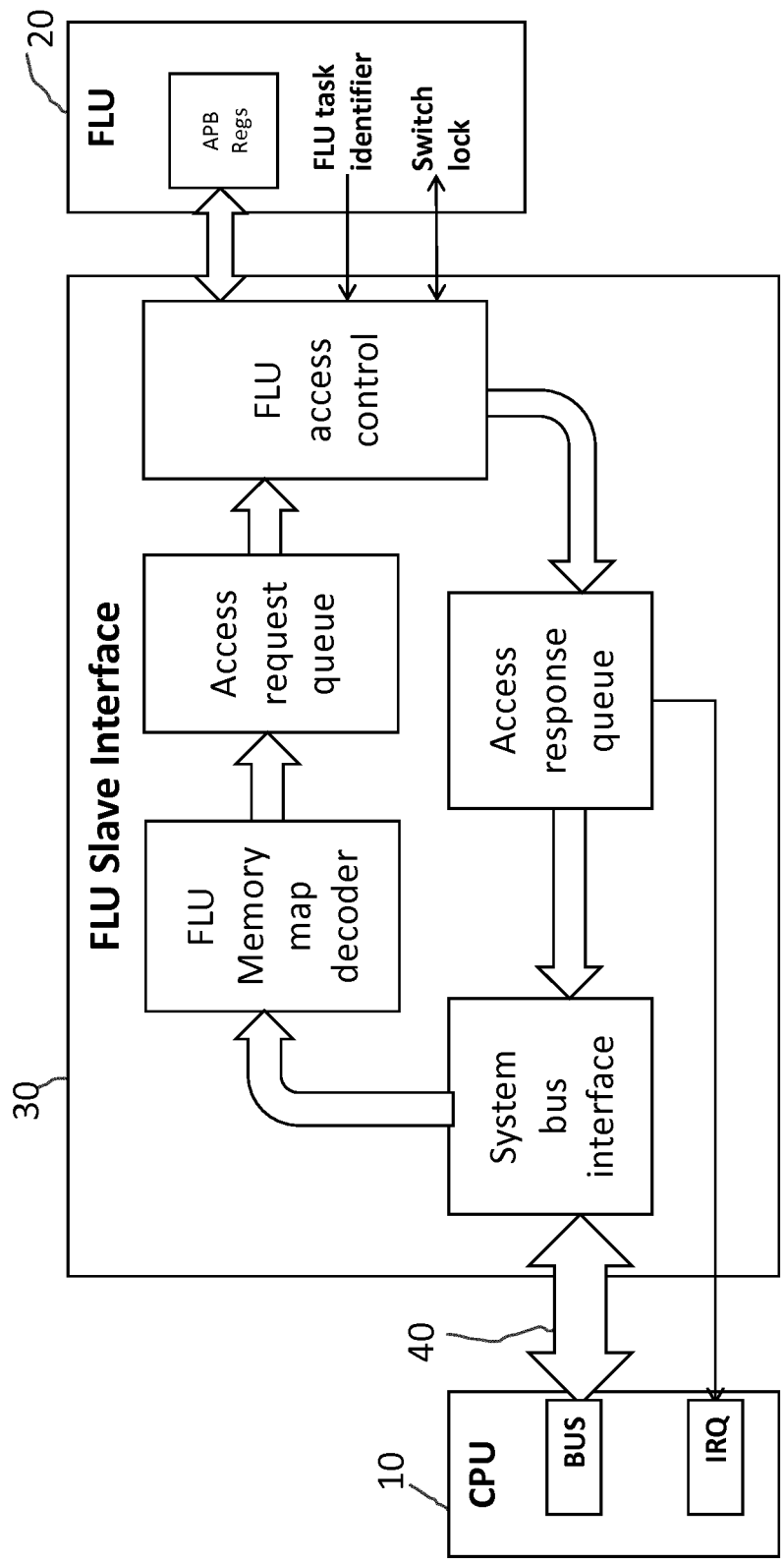
FIG. 5 provides a concrete realization of such (slave) interface.

The invented solutions to the above are illustrated in FIG. 2 and FIG. 5.

These solutions create at tight interaction between the FLU and a software computing unit so that the FLU is considered 'as if' it where part of the computing unit itself and therefore being able to extend the computing unit instruction set with user-defined function being executed by the FLU.

The concept of virtual memory map is adapted in that for the CPU tasks, or more precise the data assigned to said task, running in the FLU are represented as separate memory locations Each FLU task is associated with an unique identifier (Task-ID). This identification is done at programming time, it is a software architecture decision.

In the FLU slave interface, some system bus memory map areas are pre-allocated to each task that can be executed in FLU. It is assumed that the system memory mapping is done in such a way that the CPU effectively has access to those areas.

An "Offset" between each FLU task memory map area is fixed at design time (hard coded).

From CPU software point of view, each FLU task register bank can be accessed independently through different address ranges.

Figure 3:
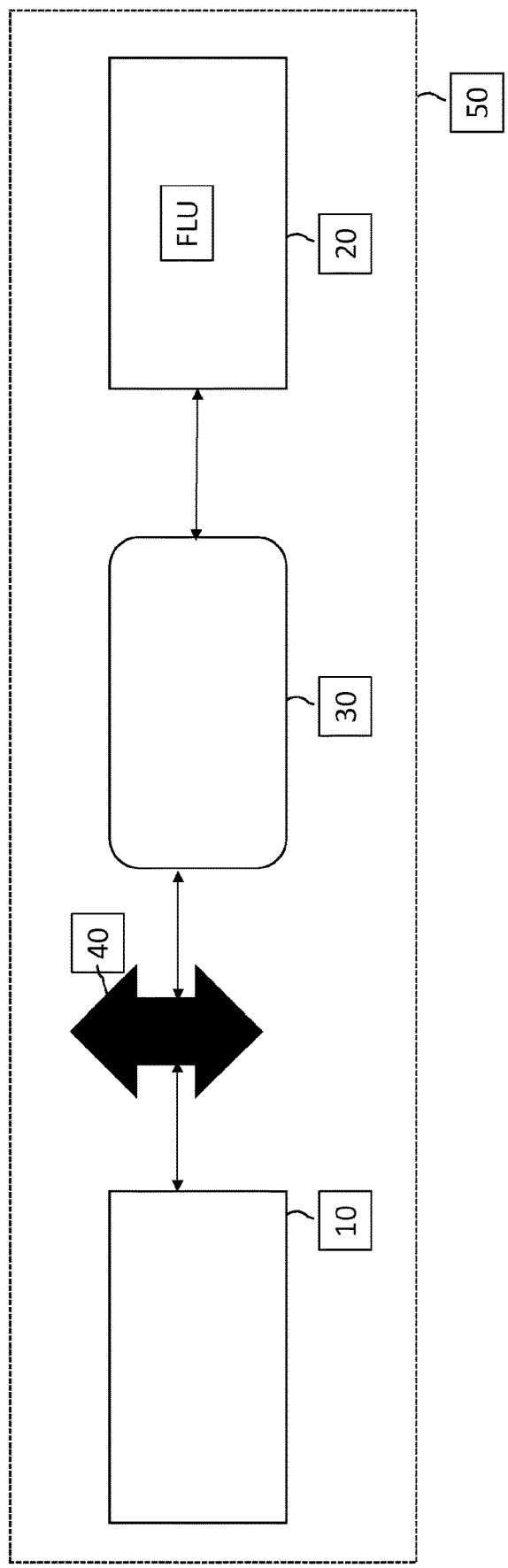
FIG. 3 schematically describes the concept of a (slave) interface.
Figure 6:
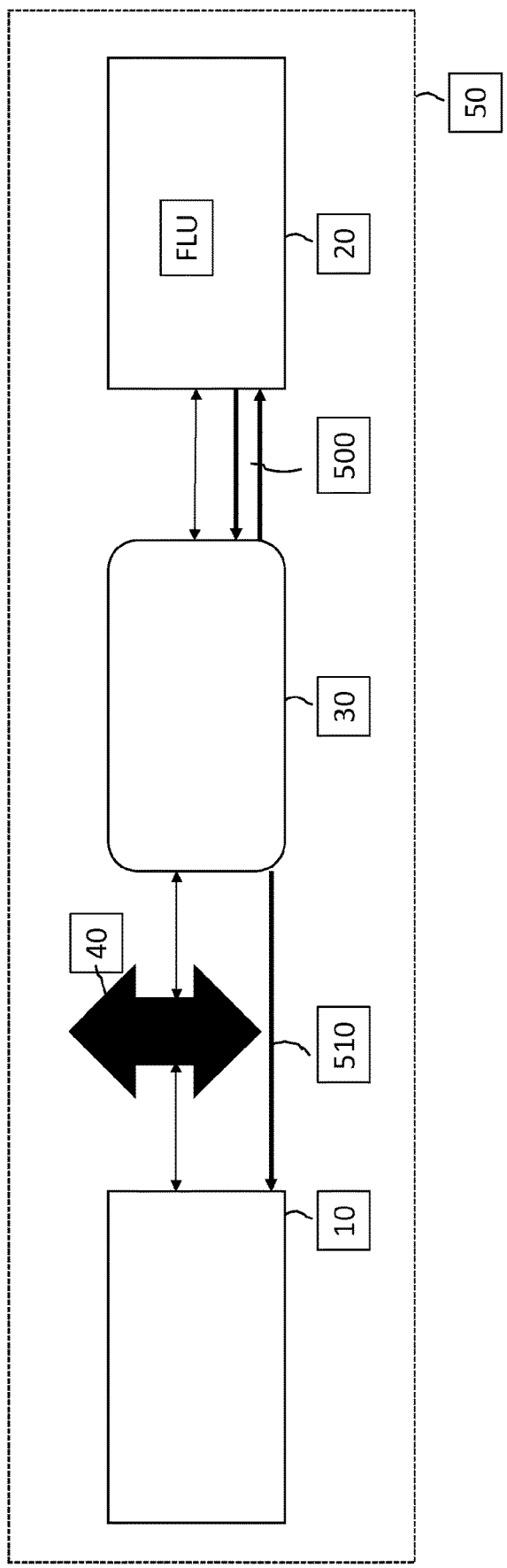
FIG. 6 schematically describes more in detail the communications with a (slave) interface.

In more general terms in FIGS. 3 and 6, one recognizes a heterogeneous hardware system comprising: a software programmable unit, a programmable logic matrix, being adapted for or capable of sequentially execution of at least two tasks, whereby the task switching is not under the control of said software programmable unit but under hardware control; (iii) a first communication means, suitable for (but only in a indirect fashion used in) communication between said electronic component and said hardware programmable unit; said heterogeneous hardware system by further comprising: an communication interface, provided between said first communication means and said hardware programmable unit, said communication interface, being adapted to ensure that access to data inside said a hardware programmable unit is corresponding to the corresponding task executed therein.

Figure 4:
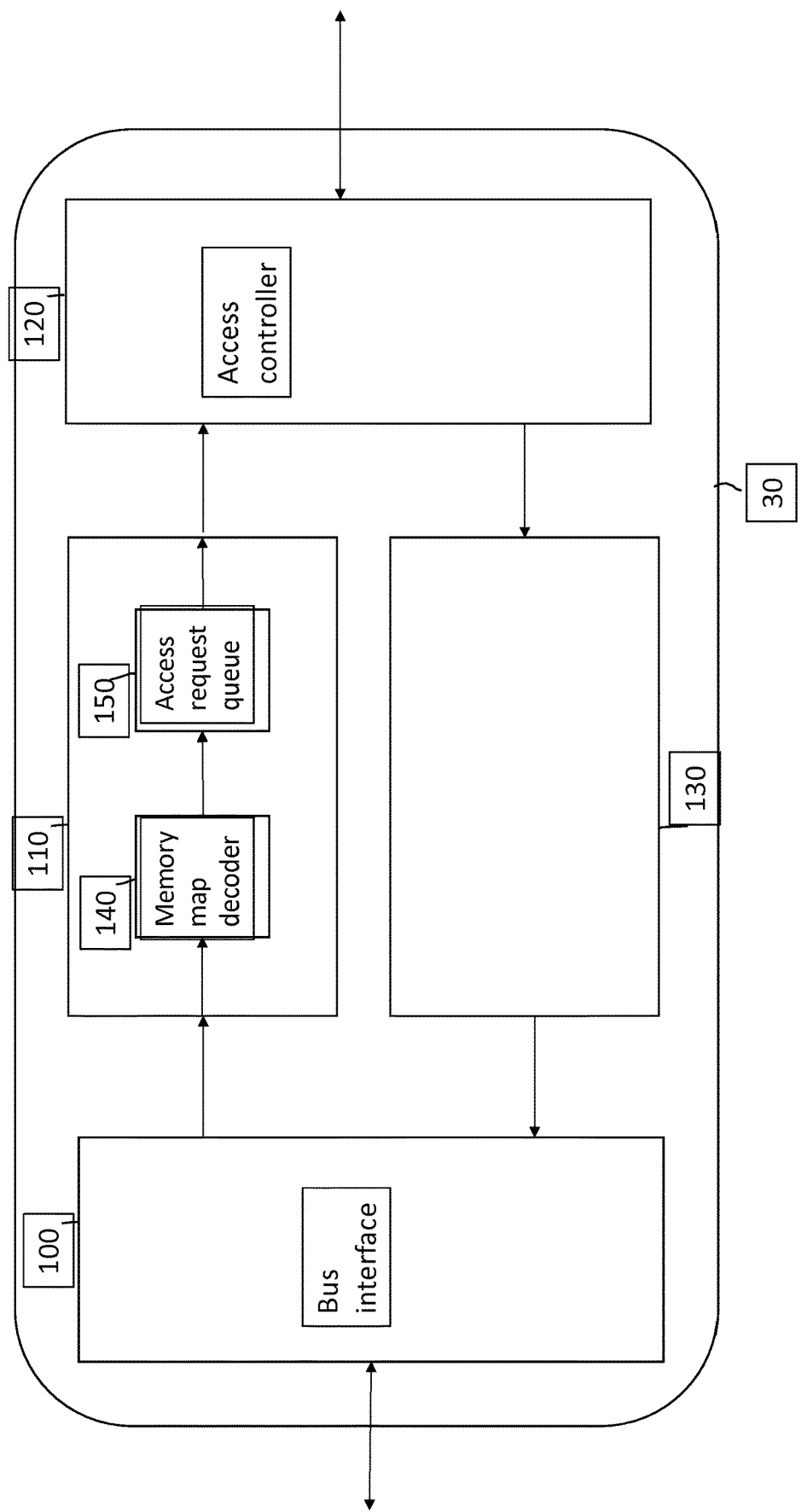
FIG. 4 provides a possible schematic of such (slave) interface.

The various subpart of the interface are now discussed in more detail and illustrated in FIGS. 4 and 5.

A first part of the interface is the system bus interface. This can be a state-of-the art slave interface using common bus protocol like APB. A second part of the interface is a FLU memory map decoder, which, based on previously described "virtual" memory mapping principle, ensures that, each access from CPU is decoded and associated to its corresponding task-ID. A third part, called access request queue, accumulates the access requests from previous block until they are processed by FLU access controller. Each request consists of:

Target FLU task-ID that identifies which function the CPU wants to access.
FLU task register address
Read/write command
Write data (in case of write command)

A fourth part is the FLU access controller.

At any time, this module receives from the FLU core the identifier of the effective task being executed inside the FLU.

Whenever an access request is available in the access request queue, the FLU task ID is compared with the request target ID. If both are equal, then following sequence is executed:

The FLU access control locks the FLU switching. This is necessary to prevent any task switching to be executed during following step to avoid access corruption.
The requested register access is executed
The access response if pushed to "access response queue"
The FLU switching lock is released Note that FLU requests can be processed in out-of-order fashion:

If multiple access to task #0 are interleaved with accessed to task #1, then, the controller can be configured to process all the accesses to task #0 regardless of their ordering with regard to access to task #1.

A final fifth part is the access response queue.

All the FLU access responses are queued for CPU to retrieve them.

IRQ notification to CPU are generated to inform the software that request responses are available.

At this stage it is worth emphasizing a few aspects.

Recall that the invention tackles data issues caused by the task switching mechanism being asynchronous of the operations of said electronic component.

Further the above illustrates an embodiment whereby both communication from CPU to FLU and vice versa is coped with. Programming contexts can be imaged wherein the above mentioned problem occurs or is only severe in one of those directions and like wise the interface can be limited to one of the communication directions.

The commonality of both directions though is said communication interface comprises one or more means, for storing to be exchanged communication in a queue.

Also the communication interface as shown in FIG. 6, more particular the fourth part, denoted FLU access controller, is adapted (see (500)) for locking said hardware programmable unit to a task while accessing the required registers within said hardware programmable unit and unlocking thereafter.

Also the communication interface as shown in FIG. 6, more particular the final fifth part denoted the access response queue, is adapted (see (510)) to provide notifications to CPU to inform the software that request responses are available.

Note that the communication interface is also a hardware unit. It could be implemented also as a separate FLU but in a preferred embodiment a dedicated circuit is used.

Finally hence the invention relates to an interface suitable for a heterogeneous hardware system outlined above being adapted to ensure that access to data inside said hardware programmable unit is corresponding to the corresponding task executed therein, said communication interface comprises one or more means for storing to be exchanged communication in a queue, and is adapted for locking said hardware programmable unit to a task while accessing the required registers within said hardware programmable unit and unlocking thereafter and/or adapted to provide notifications to CPU to inform the software that request responses are available. The interface further has memory map decoding capabilities for linking an access as required by said an electronic component to a corresponding task, said linking being based on the virtual memory principle.

Trigger

Considering again that the FLU is in a task switching operational context and that triggers or trigger signals are available with the system, being an event signal between elements of the FPCU (this is a generalization of the concept of IRS that applies only to CPU).

Although those triggers can be sampled by FLU mapped tasks for their own purpose, the problem is that the triggers are, by definition, transitory. This means that the receiver of a trigger must permanently "listen" to make sure it will not miss an event. This is obviously not the case with a FLU task in a context-switching situation.

So, the role of the interface is to permanently "listen" to triggers and forward them to FLU tasks whenever they are effectively listening. Therefore the interface is extended with a means that for each trigger input line associates with a "target task-ID" information that is configured to specify on which FLU task the incoming trigger shall apply.

1. If the FLU executed task-ID matches this target ID, then the trigger pulse is transmitted without any change
2. Else, the trigger pulse is maintained active until the FLU switches back to the specified target taskID.

Before describing particular embodiments related to the combination of a flexible logic unit with a peripheral unit in the next sections, it is worth noting that also the previous described embodiments can be used with such peripheral unit if desired to do so.

Part B Flexible Logic Unit in Combination with Peripheral Unit

In a target FPCU system, sub-systems are defined with a number of acquisition peripherals and mathematic accelerators that aim to feed the FLU mapped functions with a steady data flow. In the state-of-the-art architecture, all the peripherals can be accessed via one (or multiple) system bus master ports on crossbar(s) as illustrated in FIG. 1 BOTTOM. This architecture is convenient in terms of flexibility and hardware complexity. However it suffers of some intrinsic limitations that are a big problem for hard real time applications:

A "Read access" to a system bus takes, at least, two clock cycles. So, it is not possible to feed the FLU mapped task with new sensor data at each clock cycle.

In addition to the FLU itself, the system bus architecture is or may be shared with other master like CPU and DMA which will potentially interfere with FLU transactions by introducing unexpected wait states. Therefore, the application designer has to provision time margin to guarantee real-time constraints. This is an unacceptable waste of computing resources.

Part B.1 Flexible Logic Unit in Combination with Peripheral Unit—Direct Access

In an aspect of the invention critical data source registers are identified in peripherals (example:ADC sample data register). All of them are gathered as input to one (or multiple) multiplexers. Therefore, the value of those registers is constantly available at input of the mux. Multiplexer selection is controlled by the function within FLU. So the FLU function can get a different critical input data at each clock cycle. The system bus is not used, so there is no spurious wait-state on direct channels.

Figure 11:
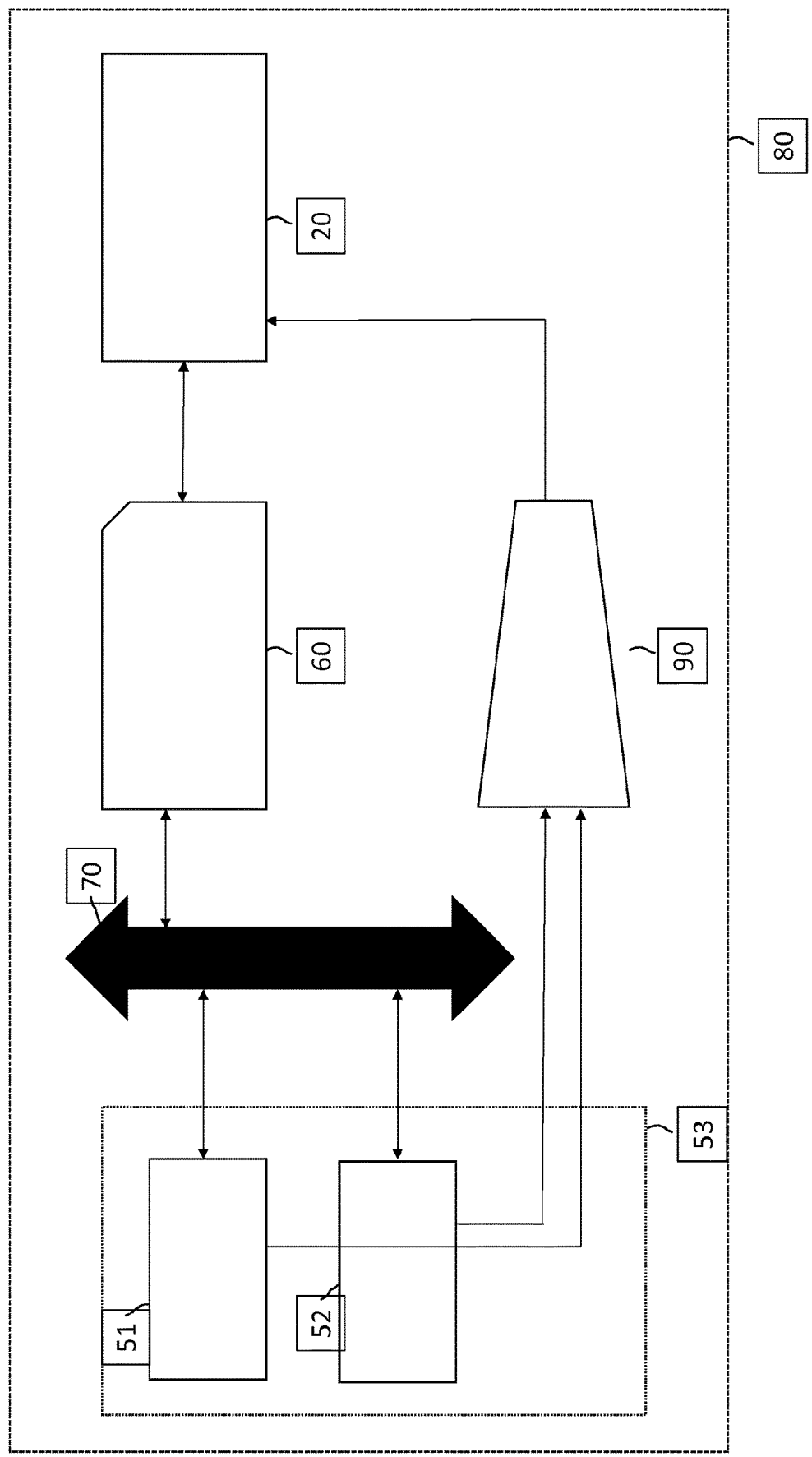
FIG. 11 schematically describes the concept of a (master) interface with a direct bypasses.

In essence here we consider a heterogeneous hardware system as shown in FIG. 1 BOTTOM LEFT comprising: (i) an electronic component being a (SOC) peripheral hardware unit as defined before, preferably a plurality of said peripheral hardware units, optionally dedicated to an electric engine control unit hardware functions; (ii) a hardware programmable unit, being a programmable logic matrix, being adapted for sequentially execution of at least two tasks, whereby the operating frequency is slower than the one of the peripheral hardware unit;

In this aspect of the invention as illustrated in FIG. 11, 12, 14, in addition to the usual a first communication means (bus), suitable for communication between said electronic component and said hardware programmable unit, with or without specific interface support as discussed further, the heterogeneous hardware system, comprising one or more second communication means, suitable for communication between said electronic component and said hardware programmable unit and provided therein between, more in particular said plurality of second communication means being connected to a selection means (multiplexer), controlled by said hardware programmable unit.

Part B.2 Flexible Logic Unit in Combination with Peripheral Unit—Interface

Figure 21:
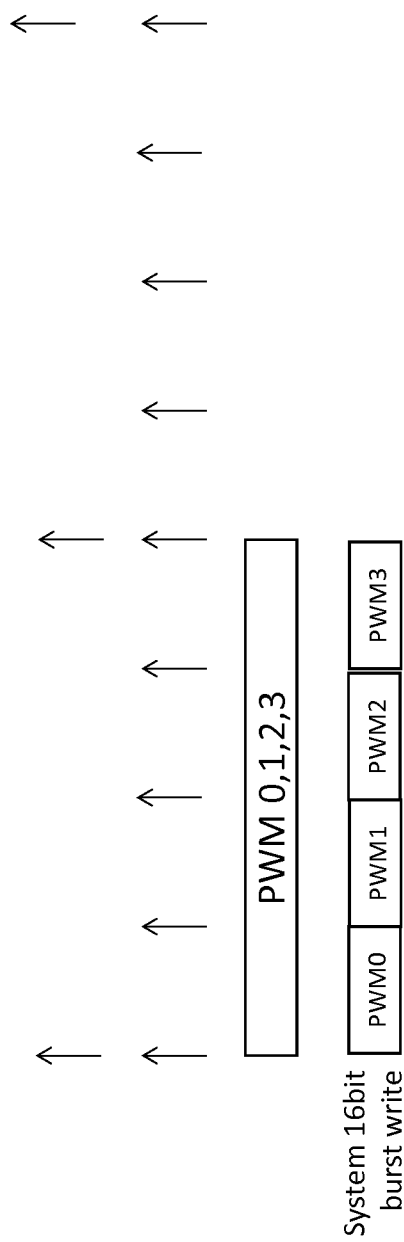
FIG. 21 describes the advantageous operation enabled by the invention.
Figure 22:
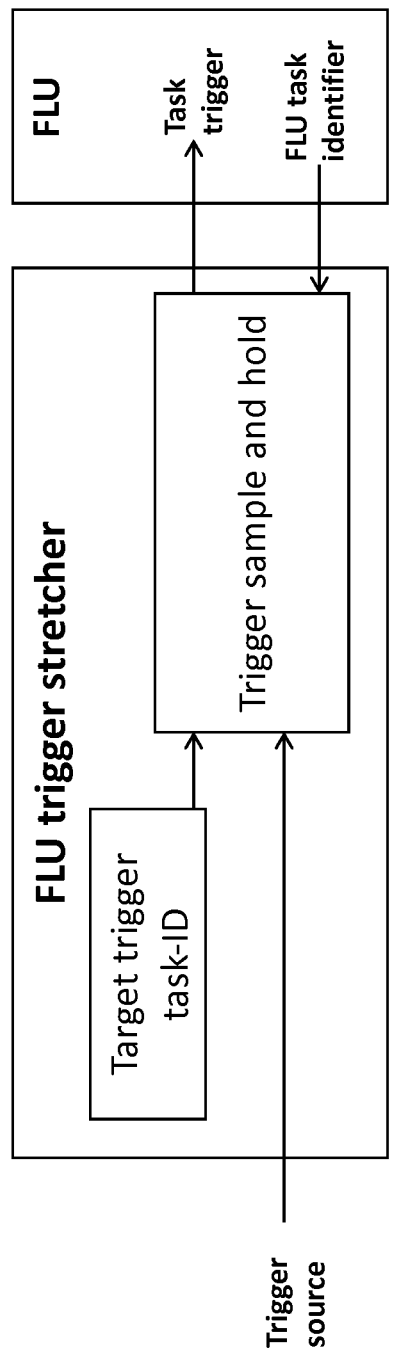
FIG. 22 describes a concrete realization of a trigger means and its communication with FLU.

In addition to the problem mentioned above, typical electric engine control application usually requires that multiple PWM channels duty cycles are updated "simultaneously" (ie. within one clock cycle of the control algorithm running in the FLU). In theory, because of the operating frequency difference between eFPGA and system bus, it could be possible to handle this situation if the FLU bus master port had a wide data port. See FIG. 21

Example: let's assume than we need to update 4 PWM channels with 16 bit data each. In this case we could imagine a 64 bit data master port on FLU with a "burst" execution on the system bus that actually executed 4 successive 16 bit write accesses on the 4 PWM.

Unfortunately, in a state-of-the-art SOC memory map, the PWM configuration registers are usually not contiguous. So, it is not possible to manage the transfer with a system bus "burst" transaction.

Figure 9:
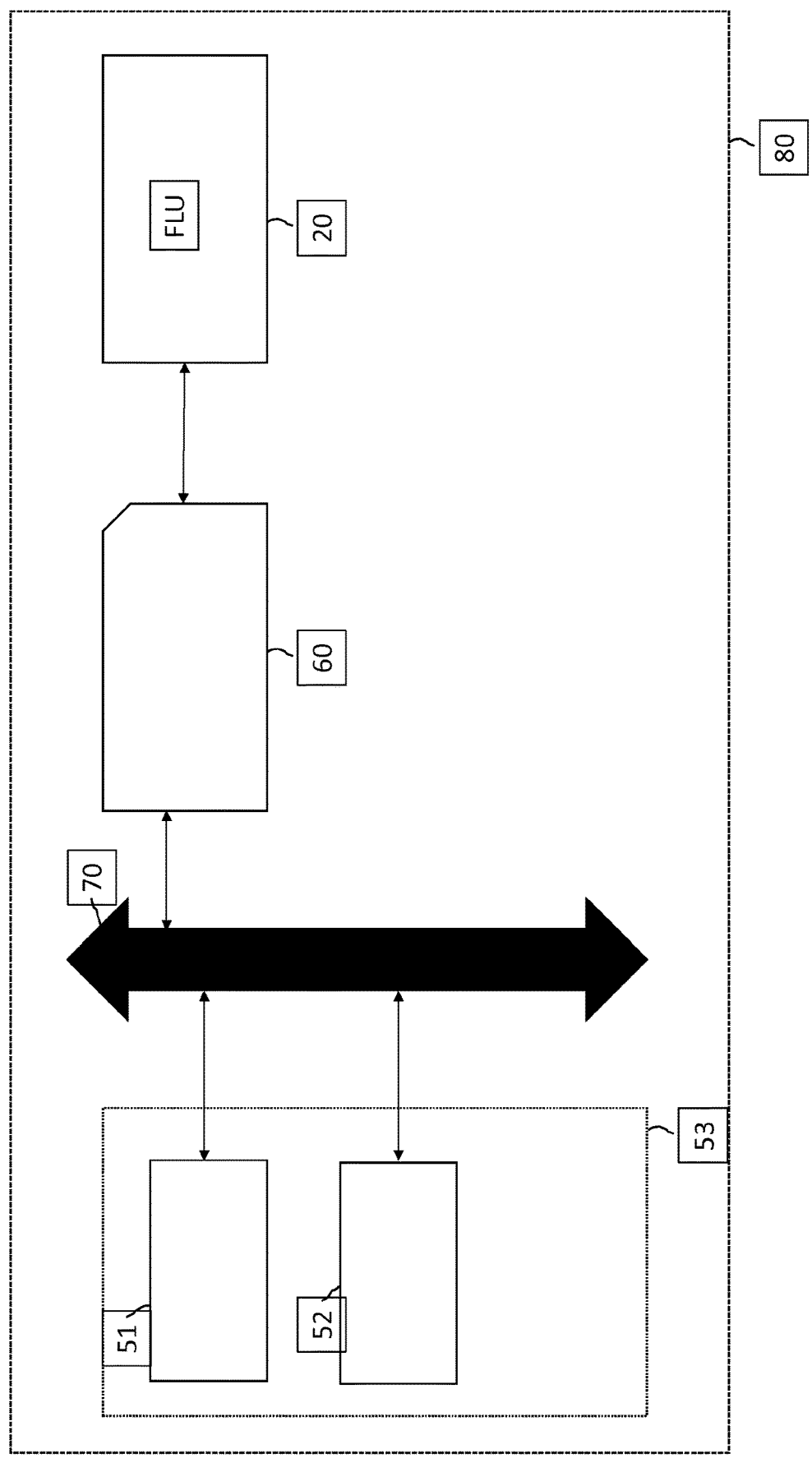
FIG. 9 schematically describes the concept of a (master) interface.
Figure 10:
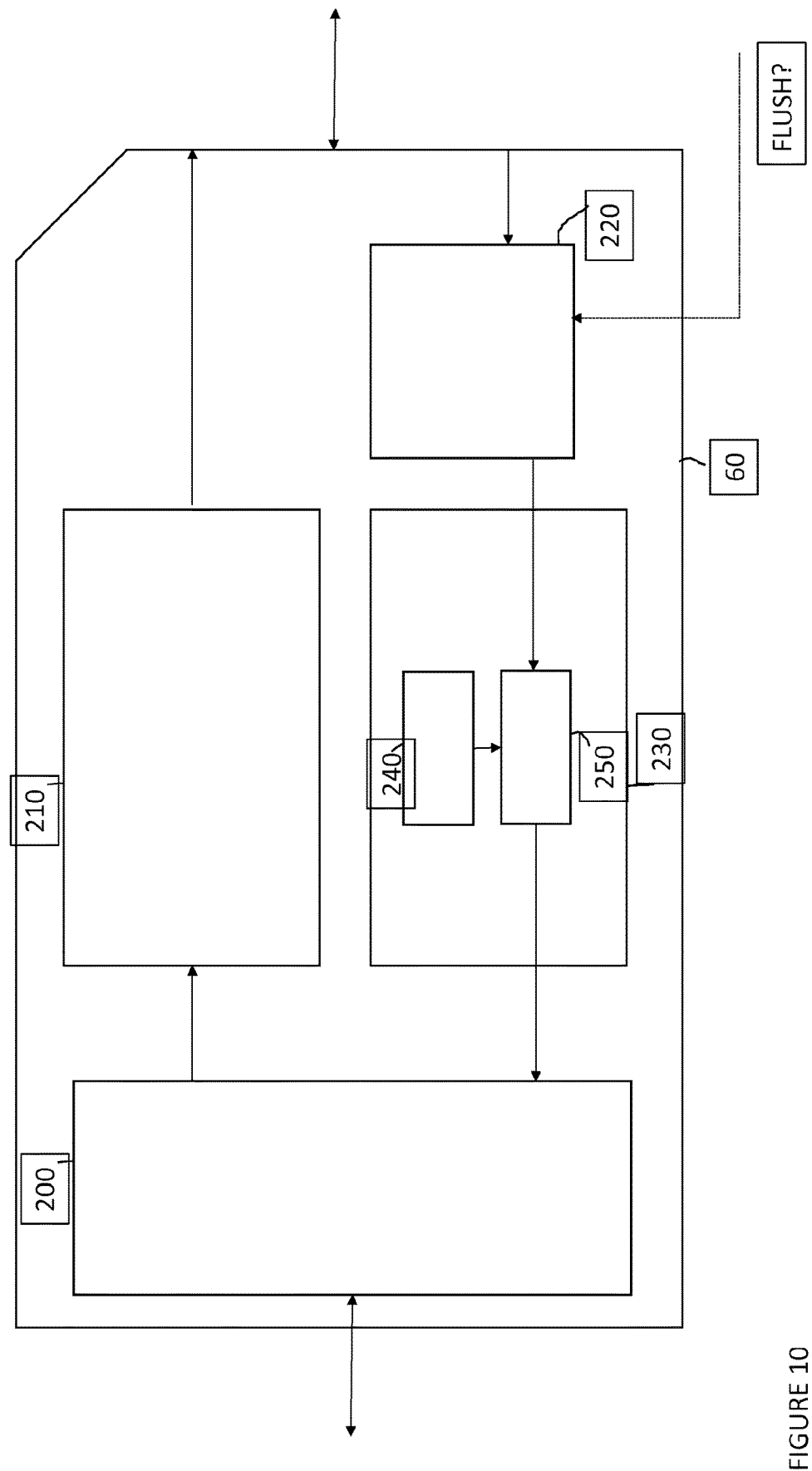
FIG. 10 provides a possible schematic of such (master) interface.
Figure 13:
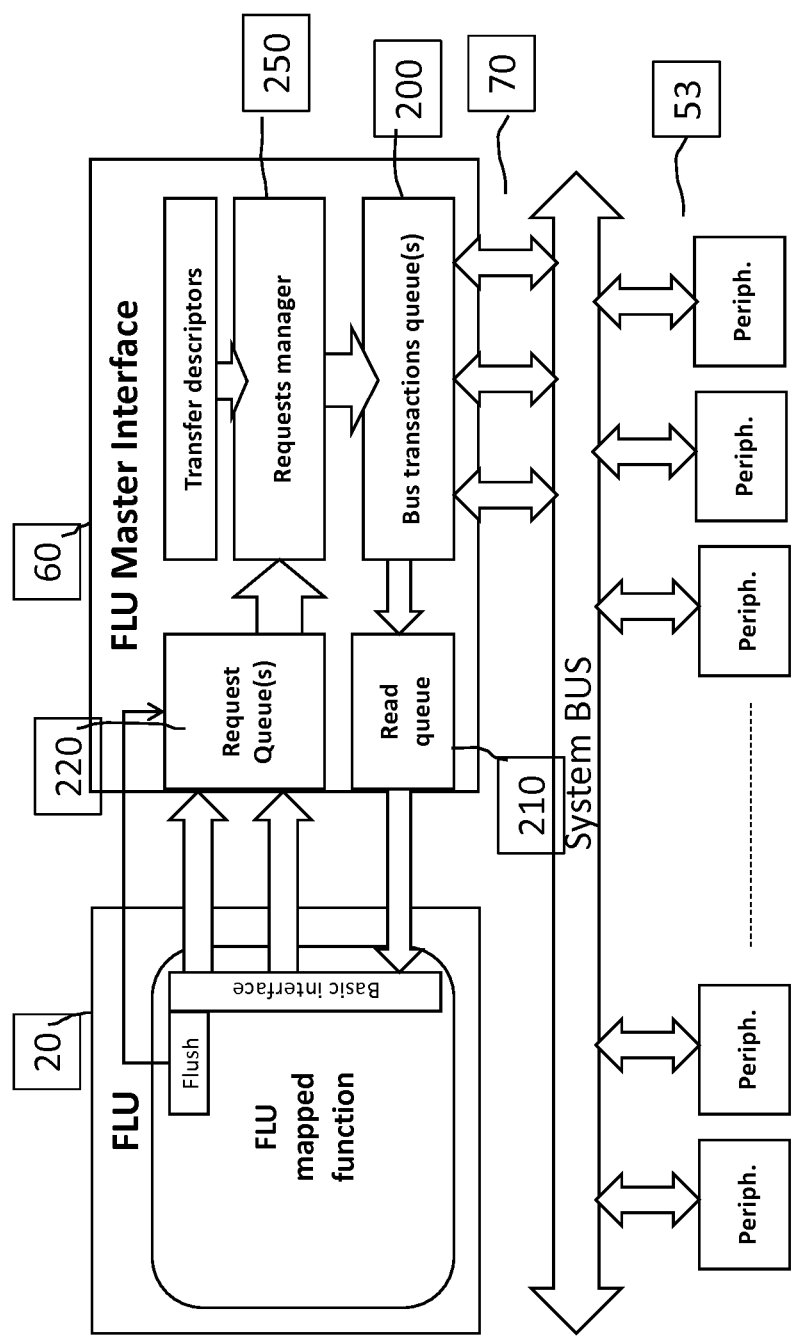
FIG. 13 provides a concrete realization of such (master) interface.

To address the above identified problems, yet another specific interface is defined as illustrated in FIG. 13 and in general terms in FIG. 9. This aspect of the invention can be combined with the direct access facilities discussed earlier as illustrated in FIG. 14 and FIG. 11.

Generally speaking a heterogeneous hardware system is disclosed, comprising: (i) an electronic component being a (SOC) peripheral hardware unit, preferably a plurality of said a peripheral hardware units, optionally dedicated to an electric engine control unit hardware functions; (ii) a hardware programmable unit, being a programmable logic matrix, whereby the operating frequency is slower than the one of the peripheral hardware unit; (iii) a first communication means (70), suitable for communication between said electronic component and said hardware programmable unit; said heterogeneous hardware system (80) by further comprising: (iv) an communication interface, provided between said first communication means and said hardware programmable unit, said an communication interface, being adapted to ensure that data transfer from said hardware programmable unit to (said plurality of) said peripheral hardware unit(s) are/can be within one clock cycle and/or data transfer from said (said plurality of) said peripheral hardware unit(s) enable hard-real time scheduling.

The interface, denoted FLU Master Interface, comprises of a first part, denoted request queue(s). Instead of having a regular bus protocol master interface like APB or AXI, the FLU function simply posts read/write access requests on master interface module. One post lasts exactly on clock cycle of the FLU clock. Because the FLU operates at relatively low frequency with regard to system clock, it does not need to get request acknowledge, so there is no protocol back pressure on FLU function.

Each queue transfer request, also denoted data transfer requirements or descriptors, consists (at least) of:
A transfer descriptor ID
A command (read/write)
A write data (if write request)
All requests are queued in a FIFO for further processing with transaction manager.

A second part of the master interface module is denoted transfer descriptor and features a local storage (RAM) that can be filled by software with a list of transfer descriptors objects.

Each descriptor consists (at least) of:
A descriptor ID
A command (read/write)
An integer that specifies the number of transfers to be executed (TRANSNUM)
An integer that specifies the data width of each transfer in bytes (TRANSWIDTH)
A list of memory map base addresses (one for each transfer)

Thanks to the transfer descriptor, it is possible to transform a single transfer request from FLU into multiple separate system access at no contiguous address locations. Example:

Let's take again the example of updating 4 PWM channels with a 16 bit duty cycle information for each. And let's assume that the FLU has a 64 bit data port toward FLU master interface module.

In this situation, the CPU software will initialize a transfer descriptor that specifies 4 transfers of 16 bit each. For each of those, a specific memory-map address is also programmed in the transfer descriptor.

When the FLU task needs to update the 4 PWMs, then is posts a write request with the four 16 bit data concatenated on the 64 bit port and associated to the above transfer descriptor ID.

Then the master interface will use the transfer descriptor information to execute four successive 16 bit bus write transactions at the 4 give addresses.

A third part of the interface is the transaction request manager. Whenever a request exists in the request queue, the manager does the following:
Retrieves the transfer descriptor that matches the ID of the request.
Cut the request in multiple atomic transfers according to transfer descriptor information.
Push each request to the bus interface queues. Each request is made of:
The request transfer descriptor ID
A memory map address
A command (read/write)
A data bytes enable and associated write data (if write access)
A fourth part of the interface is the bus interface queues.
Atomic requests are transformed in bus transaction protocols
In case of read access, the read data is pushed to the read queue with associated transfer descriptor ID
The final fifth part of the interface is the read data queue. Whenever a read data is available in read queue, the FLU master interface does the following:
It sets the read data and associated descriptor ID on FLU input ports.
The data is maintained for exactly one FLU clock cycle.
It does not wait for any acknowledge from FLU (FLU algorithm is hard real time, so it is assumed to have a predictable behavior at clock cycle)
With the descriptor ID, the FLU is able to identify the request that originated the data.

The request queue manager can be configured in two modes:
"Immediate": In this mode the requests are processed as soon as possible
"Burst": In this mode, the requests are retained in the queue until the FLU triggers the "Flush" event.

At this stage it is worth emphasizing a few aspects.

Further the above illustrates an embodiment whereby both communication from PERIPHERAL UNITS to FLU and vice versa is coped with. Contexts can be imaged wherein the above mentioned problem occurs or is only severe in one of those directions and likewise the interface can be limited to one of the communication directions. The commonality of both directions though is said communication interface comprises one or more means, for storing to be exchanged communication in a queue.

Note that also this communication interface is also a hardware unit. It could be implemented also as a separate FLU but in a preferred embodiment a dedicated circuit is used.

Specific Combinations

Figure 12:
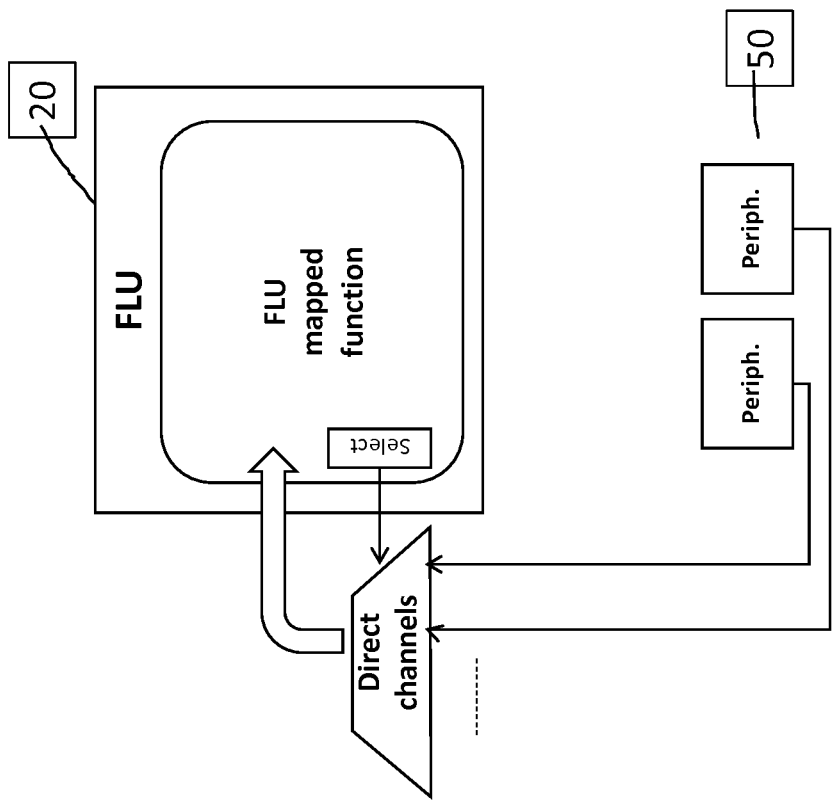
FIG. 12 provides a concrete realization of such direct bypass.
Figure 16:
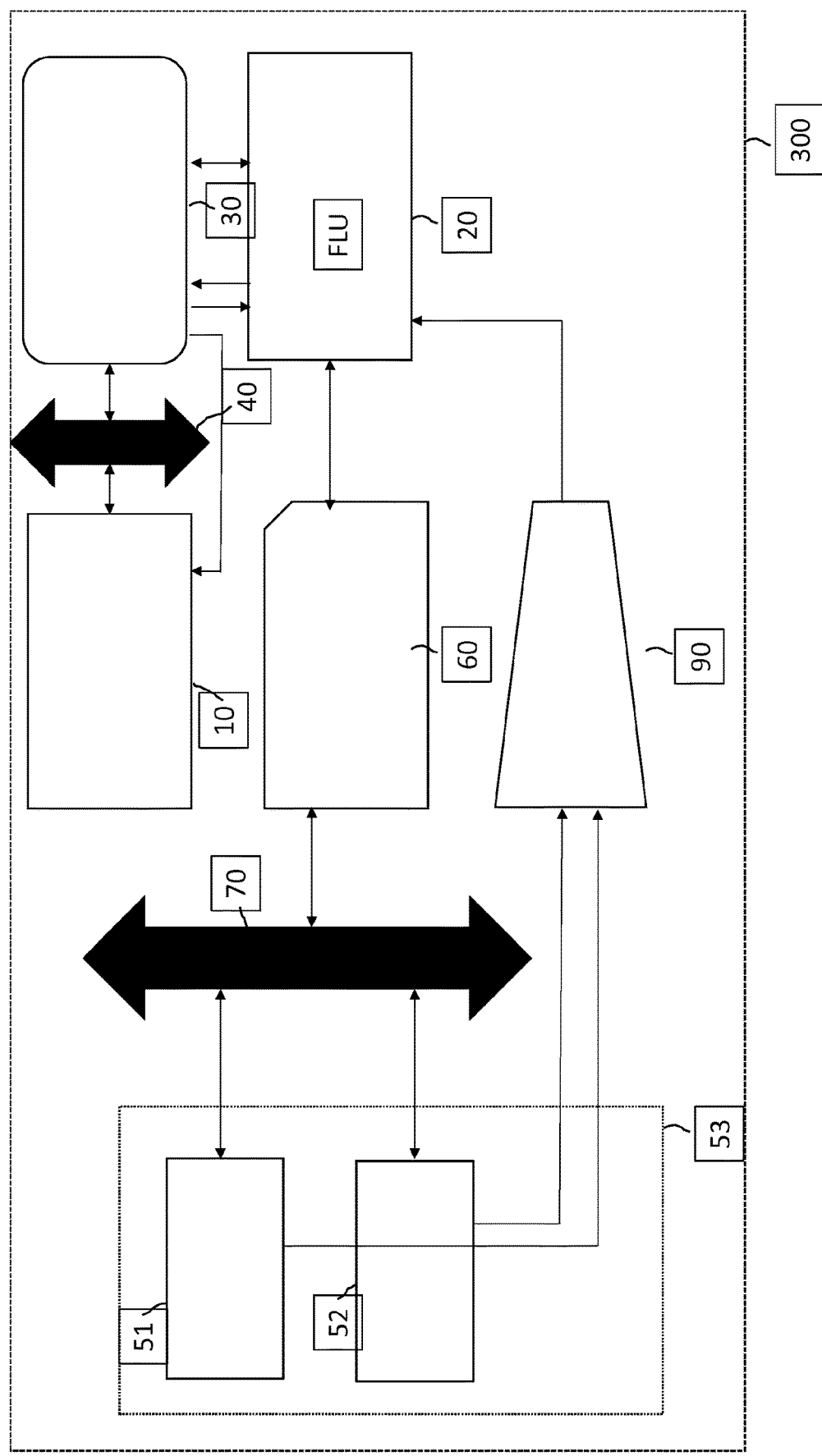
FIG. 16 describes schematically the combination of the use of both interfaces, each with a separate bus.
Figure 17:
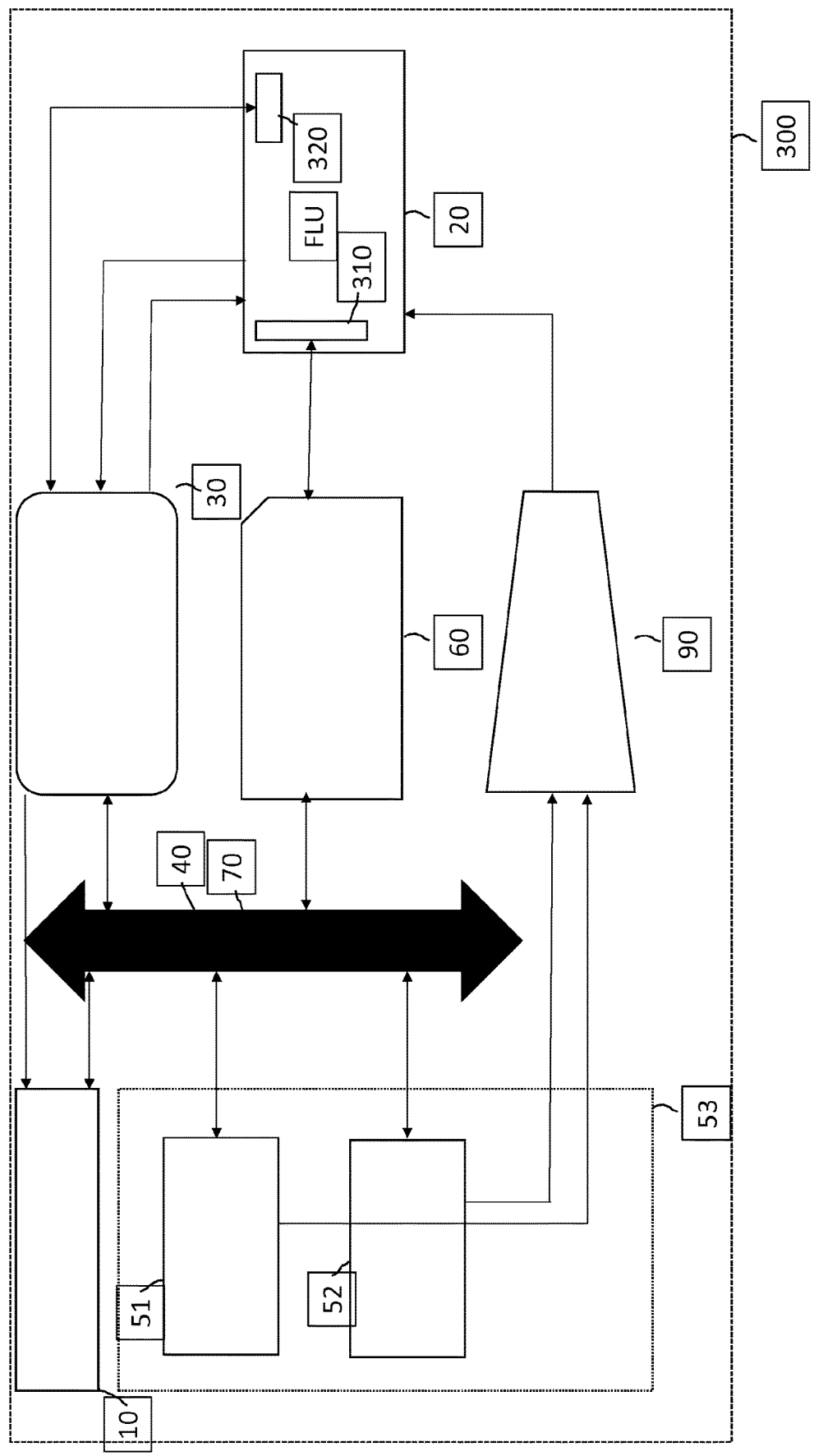
FIG. 17 describes schematically the combination of the use of both interfaces sharing the bus.
Figure 18:
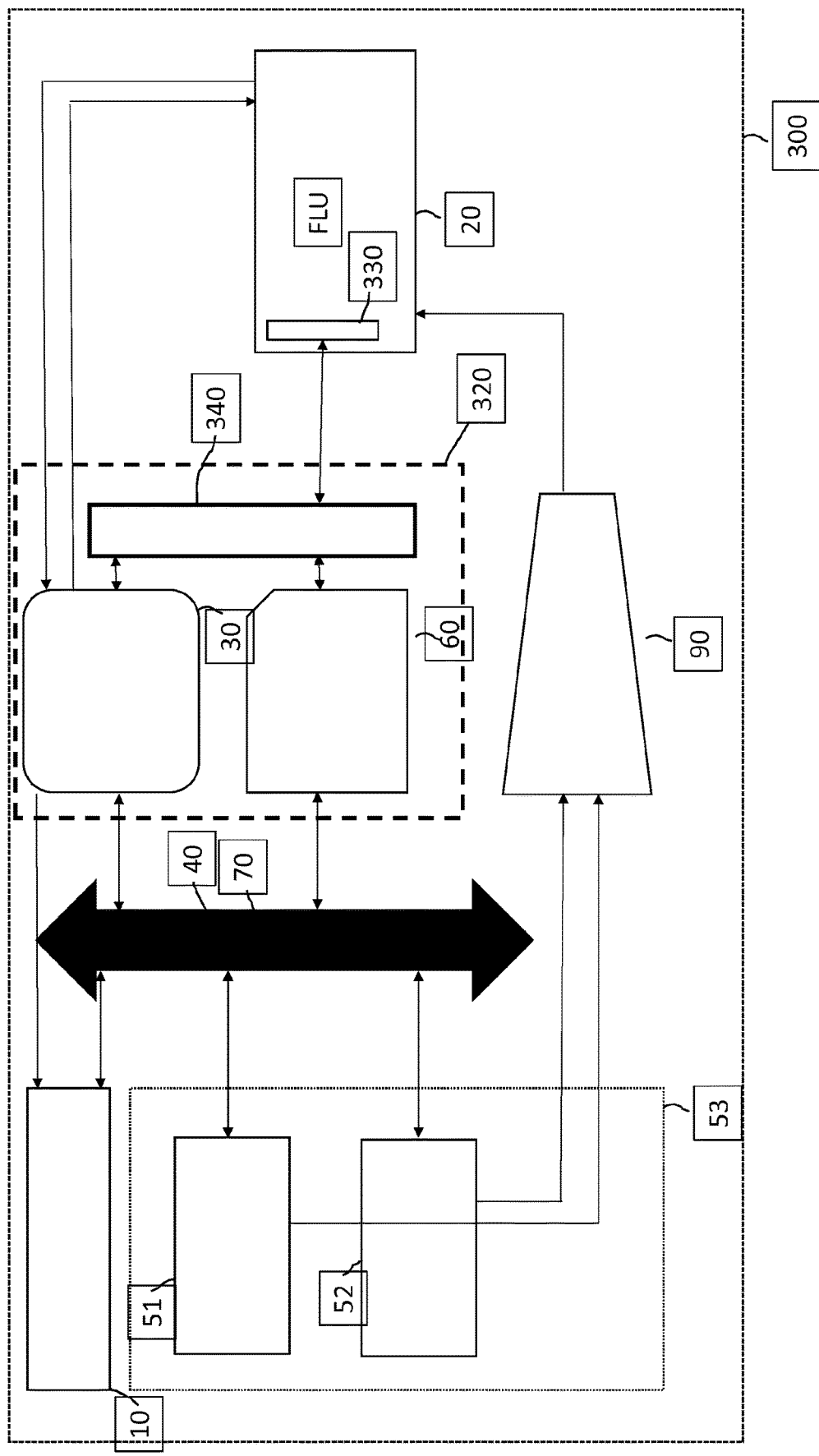
FIG. 18 describes schematically the combination of the use of both interfaces sharing the bus and exploiting an arbitration means.
Figure 19:
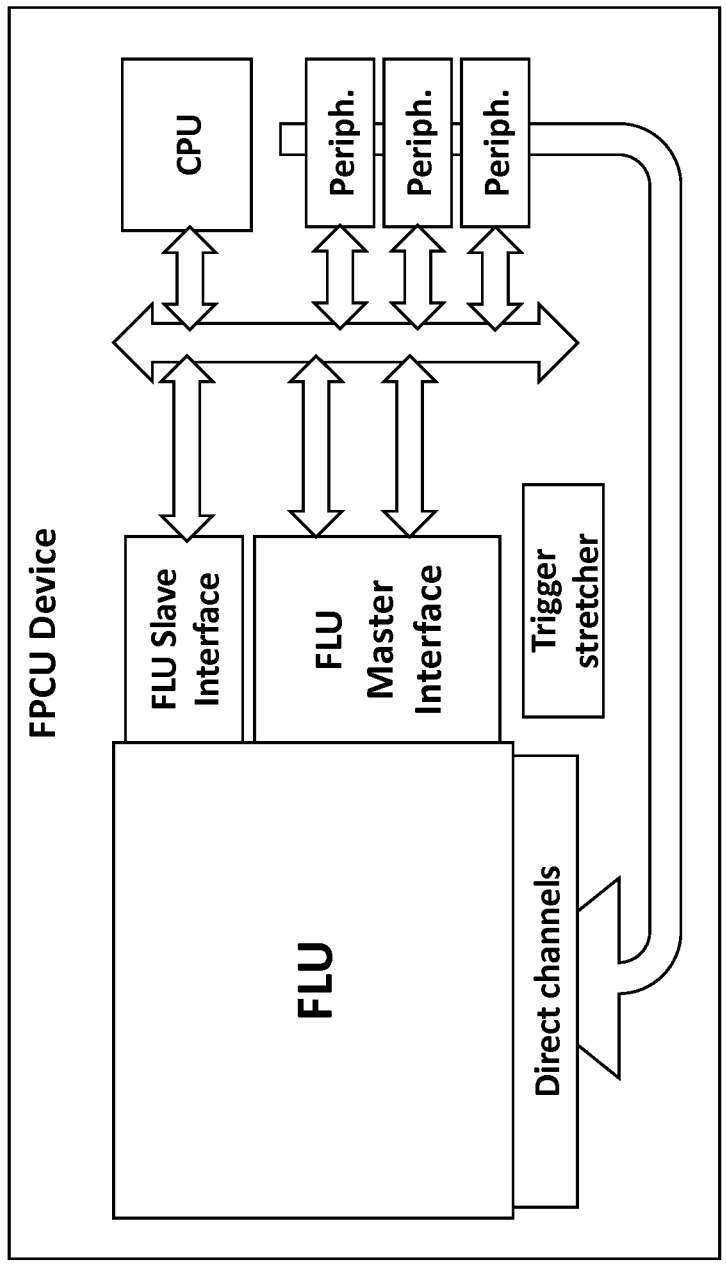
FIG. 19 provides a concrete realization on one chip of said interfaces with a FLU including direct bypasses and the concept of the trigger means.

The introduction of a FLU slave interface as described in Part A (FIGS. 3 and 5) and the introduction of a FLU master interface as described in Part B.2 (FIGS. 9, 13 and 14), the latter illustrating the further combination with the direct access concept of FIG. 12) can be combined as shown in FIGS. 16, 17 and 18.

As said the invention describes embodiments where we only have the master or slave interfaces but also embodiments where we have the master and slave interfaces, but each being are separate, as shown by the embodiment of FIGS. 16 and 17.

These architecture offers the best throughput performance in FLU input/output data-flow. However, it is quite consuming in terms of eFPGA interfaces because the transaction data ports are separate.

Figure 20:
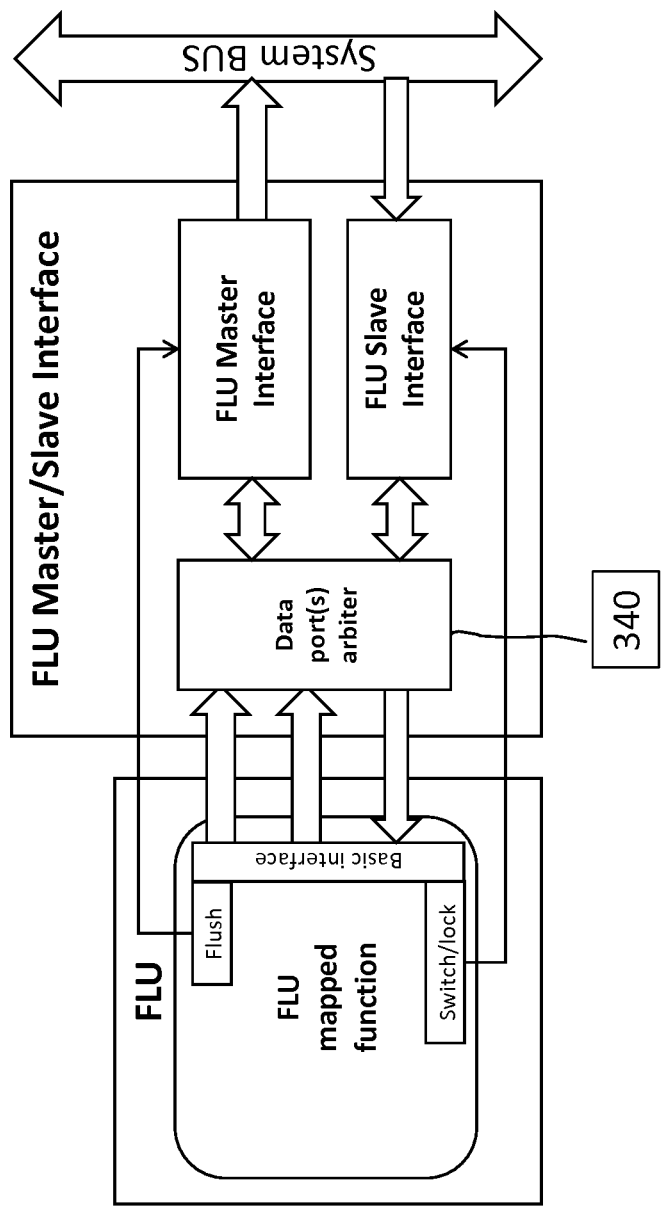
FIG. 20 provides a concrete realization of a combined interface with data port arbitration hardware.

In the embodiments of FIGS. 18 and 20, the master and slave interfaces functions are still basically the same except that they share the same read/write data interface. This requires an extra "arbiter" function to manage the access priorities between both interfaces.

With respect to the arbitration feature it is worth emphasizing that the FLU capacity is limited and preferably one reserves most of it to "real" customer algorithm. This means that interface management logic in the FLU is ALWAYS loss of computing resource for the customer. The arbitration feature in the invented interfaces or for use of a combination of those in particular contributes in making the interface in the FLU as simple as possible from FLU point of view. In essence the FLU should preferably have no requirements for pipelines, bursts, outstanding requests. . . . All those features that make a system bus interface complex and requiring a lot of resource.

Note that in general the master interface concept is based on the understanding that the FLU shall always run much slower than the master interface and the system bus and hence a separate FLU master interface module can be of use if it is taking care of complexities related to transaction request acknowledgement. This is important to save resource in FLU. Because the management of request/acknowledge sequences requires lots of resources (state machine, data buffering). And moreover it would introduce a potential uncertainty in terms of hard real-time processing because the customer has to make some worst case assumption on the maximum number of wait states the request/acknowledge sequence could induce.

Figure 7:
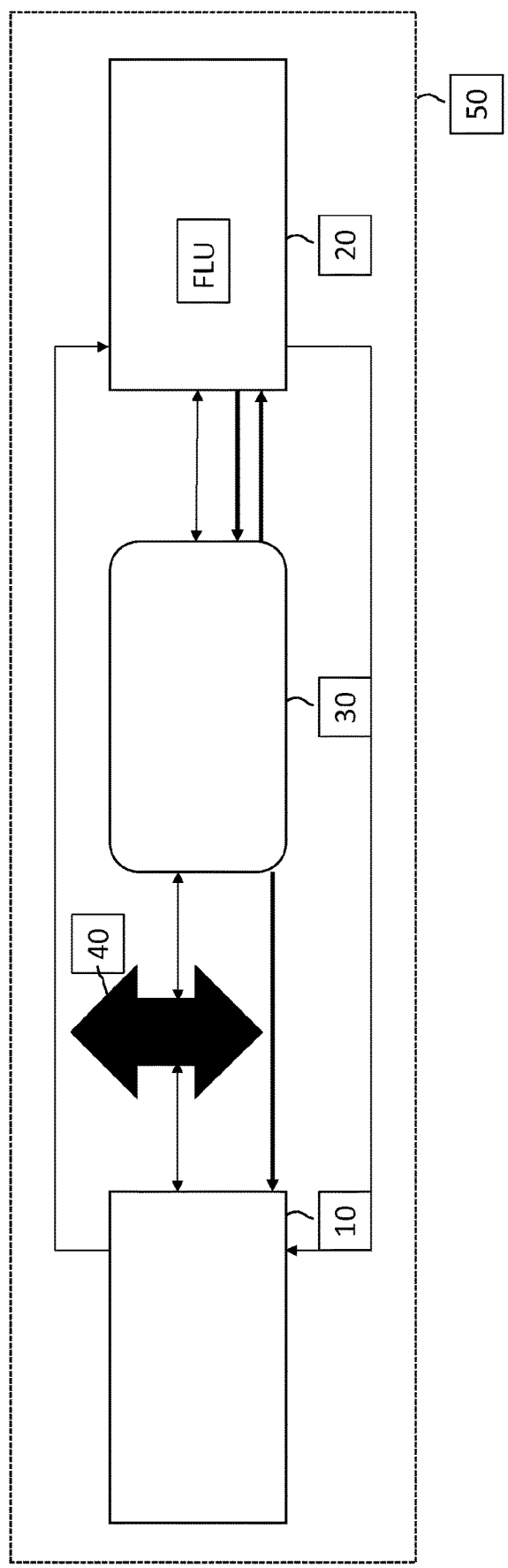
FIG. 7 schematically describes the concept of a (slave) interface with direct bypasses in one or both directions.

Note that the concept of direct access as described in Part B.2 can be applied also to the context of Part A as generally illustrated in FIG. 7.

Further Considerations

Queue Dimensions

As mentioned in preferred embodiments of the invention said communication interface comprises one or more means (150), (130), (210), (220) for storing to be exchanged communication in a queue.

It is worth to elaborate on some depths calculation criteria:
On the slave interface (used in the CPU-FLU context)
The depth of the FIFO can be specified as equal to the maximum number of words in a transaction "burst" as allowed by the interconnect bus protocol.
Example with APB: burst does not exist (so, depth=1)
Example with AHB: burst length is max 19 (so, depth=16)
. . .
On the master interface (used in the PERIPHERAL-FLU context)
At minimum, it is calculated like slave interface
In addition, it must be at minimum equal to the number of "flushable" data size.
This size is bounded by the operating frequency ratio between FLU and interconnect bus.

Realization of the Interfaces

As mentioned preferably the interfaces are a dedicated circuit or hardwired. In principle the interface could be put in the hardware programmable unit or a FLU. But, keep in mind that an eFPGA matrix is extremely big compared to the actual function that can be mapped inside. This means that we really try to reserve the FLU area for the user application. Therefore any hardware function that is well defined and generic enough has to be hardwired (as is the case here) as much as possible.

Flush Function

Figure 14:
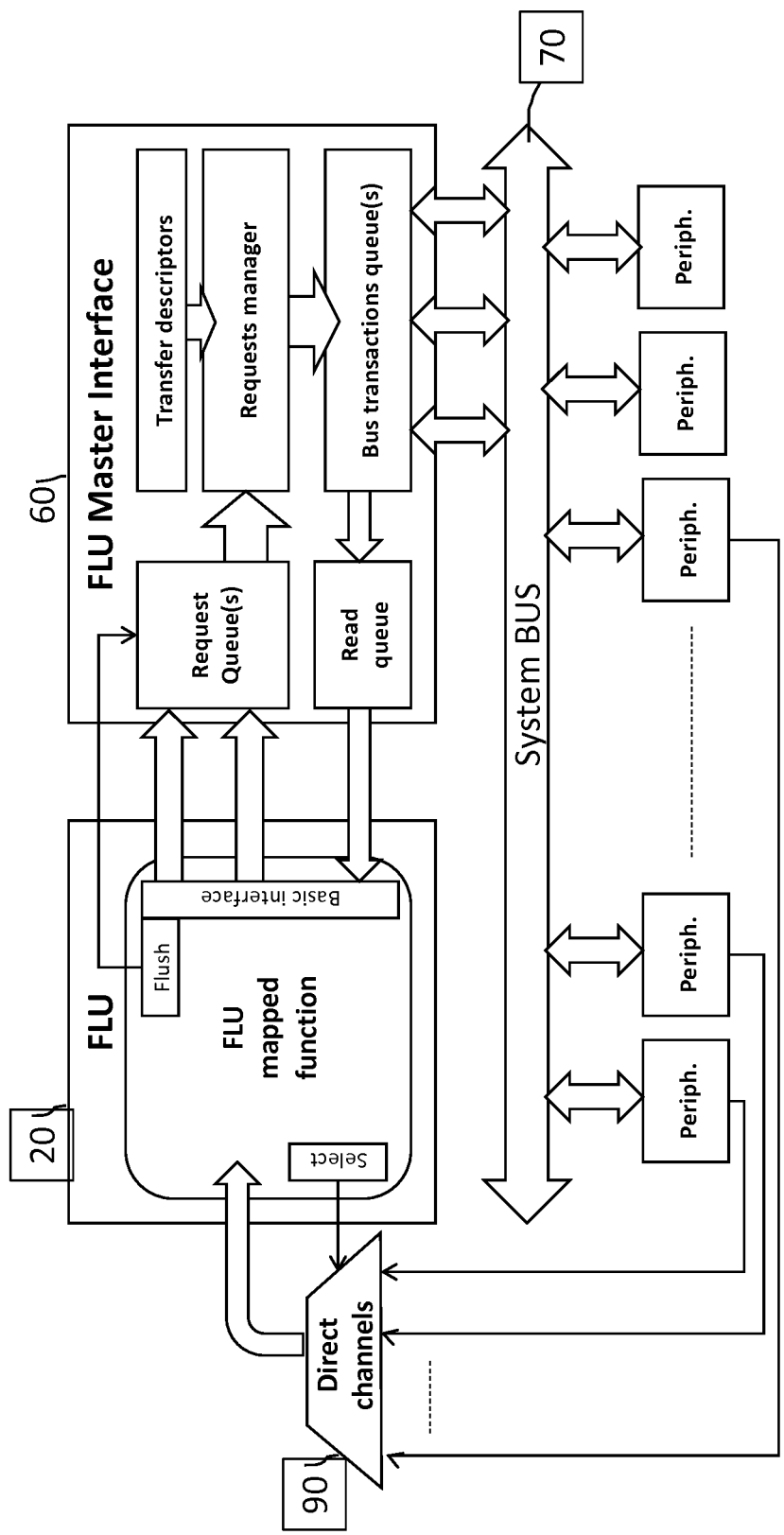
FIG. 14 provides a concrete realization of such (master) interface with direct bypass.
Figure 15:
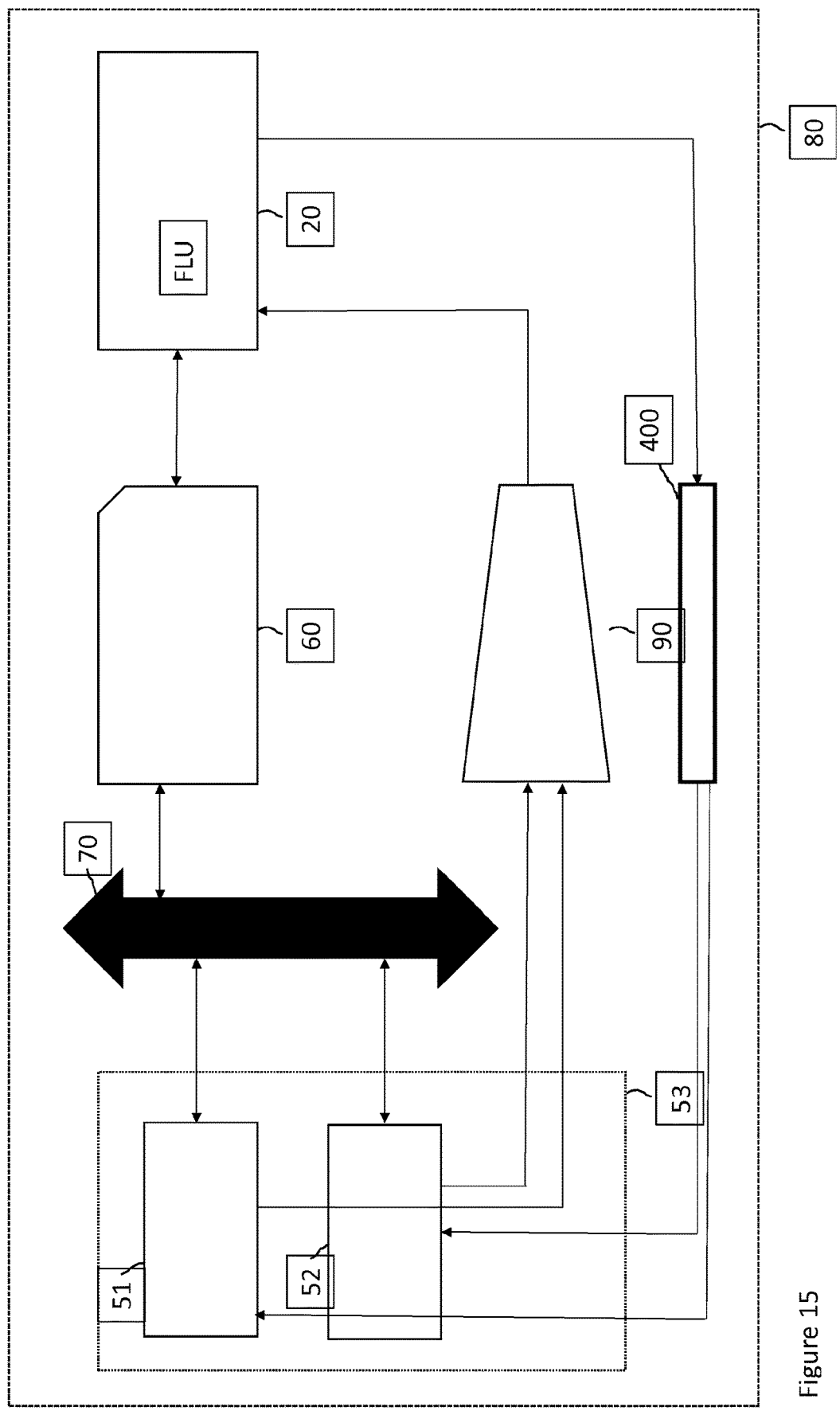
FIG. 15 schematically describes the concept of a (master) interface with a direct bypasses in both directions.

As illustrated in FIG. 14 a flush function possibility can be foreseen.
A possible use-case is the following:
Imagine a configuration where the peripherals operate at 100 MHz and the FLU at 10 MHz.
Usually, when running a motor control algorithm, it is expected that the PWM duty ratios are updated "at the same time" on all PWM channels.
In our case "at the same time" means "within one clock period of the control algorithm)
If we consider a 4 phases motor, this means that the FLU has to write 4 data toward PWM peripherals through master interface
So, in any case, the FLU takes 4 clock cycles to write those data
If the "flush" function is not implemented, then each write will be transferred to PWM almost immediately (because interface is 10× faster than FLU). So, the PWM are NOT updated in a single FLU clock periode.
If the "flush" function is there, the sequence is the following
The FLU algorithm is designed such as it anticipate the PWM update time by 5 cycles
The FLU takes 4 cycles to write the PWM data (those ones are filled in the FIFO, but not transferred to interconnect)
The FLU triggers the "flush" request Then the master interface flushed the FIFO requests one by one. But, because of the 10× frequency ratio, the 4 transaction can easily take place during one FLU clock cycle.

Figure 8:
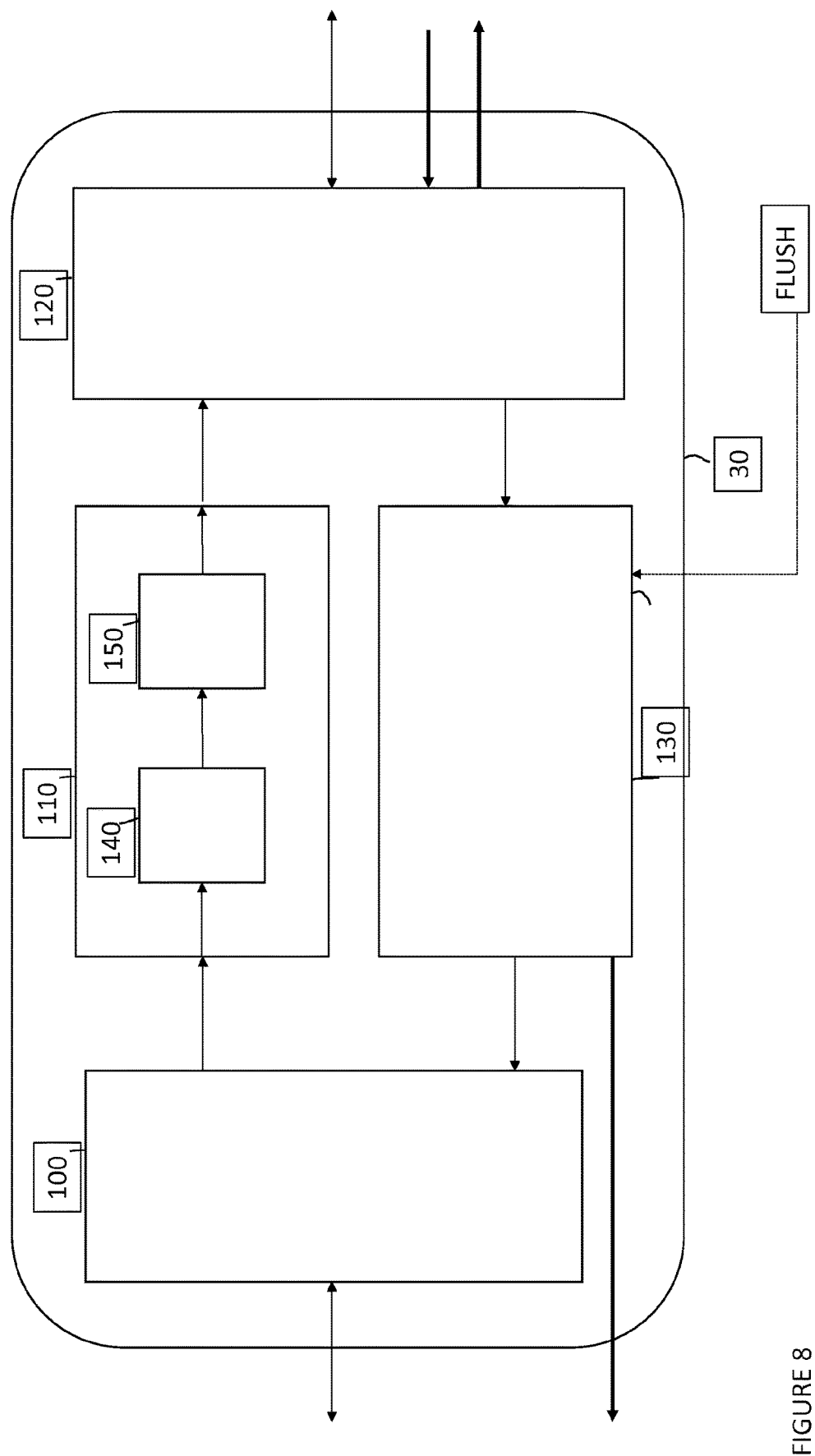
FIG. 8 provides a further schematic of such (slave) interface with indication of related communications (including the optional concept of a flush signal).

As shown in FIG. 8 a flush functionality could be added also in the slave interface.

The invention claimed is:

1. A electronic system comprising:
  (i) an electronic component being a peripheral hardware unit, comprising a plurality of peripheral hardware units, optionally dedicated to an electric engine control unit hardware functions;
  (ii) a hardware programmable unit, being a programmable logic matrix, optionally being adapted for sequential execution of at least two tasks, whereby an operating frequency is slower than the one of the peripheral hardware unit;
  (iii) a first communication means, suitable for communication between the electronic component and the hardware programmable unit; the electronic system by further comprising:
  (iv) a communication interface, being a hardware unit, provided between the first communication means and the hardware programmable unit, the communication interface, being adapted to ensure that data transfer from the hardware programmable unit to the plurality of the peripheral hardware unit(s) are/can be within one clock cycle and/or data transfer from the plurality of the peripheral hardware unit(s) enable hard-real time scheduling,
  wherein:
    the communication interface further comprises a first means for interfacing with the first communication means;
    the first means is capable to split single transfer communication request from the hardware programmable unit into multiple independent transfers on the first communication means, based on data transfer requirements, provided by the hardware programmable unit;
    the first means for interfacing with the first communication means; and
    a hardware programmable unit communication request manager, comprising a storage means, storing data transfer requirements linked to the identifier, the hardware programmable unit communication request manager, being capable to link the communication request from the hardware programmable unit with such data transfer requirements based on a identifier provided by the hardware programmable unit.

2. The electronic system of claim 1, comprising a plurality of second communication means, suitable for communication between the electronic component and the hardware programmable unit and provided therein between, the plurality of second communication means being connected to a selection means, controlled by the hardware programmable unit.

3. The electronic system of claim 1, wherein the communication interface comprises one or more means, for storing to be exchanged communication in a queue, preferably at least one such means for storing to be exchanged communication from the electronic component to the hardware programmable unit and at least one such means for storing to be exchanged communication from the hardware programmable unit to the electronic component.

4. The electronic system of claim 1, further comprising:
  (i) at least one electronic component, being capable to generate task specific trigger signals;
  (ii) at least one first communication means, suitable for the communication between the electronic component and the hardware programmable unit; and
  (iii) at least one communication interface, being a hardware unit, provided between one of the first communication means and one of the hardware programmable unit, the electronic system further comprising a means, part of the communication interface, for temporality storing the task specific trigger signals and supply those to the hardware programmable unit when the applicable task is executed therein.

5. The electronic system of claim 1, wherein:
  the hardware programmable unit is a programmable logic matrix, whereby the operating frequency of the programmable logic matrix is slower than the one of the peripheral hardware unit; and
  the hardware programmable unit is adapted to generate a flush signal for the communication interface to thereby release the stored communications to the peripheral hardware unit(s).

6. The electronic system of claim 1, comprising at least one electronic component, whereby the user-instruction set for programming the electronic system being electronic component instruction set extended with user-defined functions, being executed or executable by the hardware programmable unit.

7. The electronic system of claim 1, wherein the first means further comprises one or more queues.

8. A electronic system comprising:
  (i) an electronic component being a peripheral hardware unit, comprising a plurality of peripheral hardware units, optionally dedicated to an electric engine control unit hardware functions;
  (ii) a hardware programmable unit, being a programmable logic matrix, optionally being adapted for sequential execution of at least two tasks, whereby an operating frequency is slower than the one of the peripheral hardware unit;
  (iii) a first communication means, suitable for communication between the electronic component and the hardware programmable unit; the electronic system by further comprising:
  (iv) a communication interface, being a hardware unit, provided between the first communication means and the hardware programmable unit, the communication interface, being adapted to ensure that data transfer from the hardware programmable unit to the plurality of the peripheral hardware unit(s) are/can be within one clock cycle and/or data transfer from the plurality of the peripheral hardware unit(s) enable hard-real time scheduling,
  (v) the electronic component, being a software programmable unit, preferably a microprocessor core or a graphics processor core;
  (vi) the hardware programmable unit, being a programmable logic matrix, being adapted for sequentially execution of at least two tasks, whereby the task switching is not under the control of the software programmable unit;
  (vii) the first communication means for the communication between the electronic component and the hardware programmable unit; the electronic system by further comprising:
  (viii) the communication interface, being a hardware unit, provided between the first communication means and the hardware programmable unit, the communication interface, being adapted to ensure that access to data inside the hardware programmable unit is corresponding to the corresponding task executed therein,
wherein:
the communication interface further comprises a first means for interfacing with the first communication means; and
the first means is capable to split single transfer communication request from the hardware programmable unit into multiple independent transfers on the first communication means, based on data transfer requirements, provided by the hardware programmable unit.

9. The electronic system of claim 8, wherein the communication interface comprises one or more means for storing to be exchanged communication in a queue, preferably at least one such means for storing to be exchanged communication from the electronic component to the hardware programmable unit and at least one such means for storing to be exchanged communication from the hardware programmable unit to the electronic component.

10. The electronic system of claim 8, wherein the communication interface further comprises:
the first means for interfacing with the first communication means;
a second means for access control to the hardware programmable unit, adapted for locking the hardware programmable unit to a task while accessing the required registers within the hardware programmable unit and unlocking thereafter; and
a hardware programmable unit memory map decoder, linking an access as required by the electronic component to a corresponding task, the linking being based on a virtual memory principle.

11. The electronic system of claim 8, wherein:
the hardware programmable unit comprises task identification means for identifying the task the hardware programmable unit is executing and/or a task lock means for ensuring that temporality the hardware programmable unit will not switch; and
a second means for access control to the hardware programmable unit is connected to the task identification means and/or the task lock means.

12. The electronic system of claim 8, wherein the communication between the electronic component and the hardware programmable unit is bidirectional.

13. A electronic system comprising:
(i) an electronic component being a peripheral hardware unit, comprising a plurality of peripheral hardware units, optionally dedicated to an electric engine control unit hardware functions;
(ii) a hardware programmable unit, being a programmable logic matrix, optionally being adapted for sequential execution of at least two tasks, whereby an operating frequency is slower than the one of the peripheral hardware unit;
(iii) a first communication means, suitable for communication between the electronic component and the hardware programmable unit; the electronic system by further comprising:
(iv) a communication interface, being a hardware unit, provided between the first communication means and the hardware programmable unit, the communication interface, being adapted to ensure that data transfer from the hardware programmable unit to the plurality of the peripheral hardware unit(s) are/can be within one clock cycle and/or data transfer from the plurality of the peripheral hardware unit(s) enable hard-real time scheduling,
(v) the electronic component, being a software programmable unit, preferably a microprocessor core or a graphics processor core;
(vi) the hardware programmable unit, being a programmable logic matrix, being adapted for sequentially execution of at least two tasks;
(vii) at least one first communication means for the communication between the electronic component and the hardware programmable unit; and
(viii) at least one communication interface, being a hardware unit, provided between one of the first communication means and one of the hardware programmable unit, whereby an access as required by the electronic component to a corresponding task, being represented in a virtual memory, whereby each task as a distinct zone therein, the communication interface being adapted to operate with such representation,
wherein:
the communication interface further comprises a first means for interfacing with the first communication means;
the first means is capable to split single transfer communication request from the hardware programmable unit into multiple independent transfers on the first communication means, based on data transfer requirements, provided by the hardware programmable unit.

14. The electronic system of claim 13, wherein the communication between the electronic component and the hardware programmable unit is bidirectional.

* * * * *